(12) United States Patent
Ishida et al.

(10) Patent No.: US 7,694,540 B2
(45) Date of Patent: Apr. 13, 2010

(54) DEVICE AND METHOD FOR DAMPING VIBRATION OF ROTATING SHAFT SYSTEM

(75) Inventors: Yukio Ishida, 308, Nenogami, Nagakute-cho, Aichi-gun, Aichi-ken (JP); Jun Liu, Aichi-ken (JP); Shoji Uchimura, Aichi-ken (JP); Hideki Morimitsu, Aichi-ken (JP); Hirohide Ishiguro, Aichi-ken (JP)

(73) Assignees: Jun Lin, Aichi-ken (JP); Yukio Ishida, Aichi-ken (JP); Sintokogio, Ltd., Aichi-ken (JP)

( * ) Notice: Subject to any disclaimer, the term of this patent is extended or adjusted under 35 U.S.C. 154(b) by 99 days.

(21) Appl. No.: 10/571,533

(22) PCT Filed: Sep. 10, 2004

(86) PCT No.: PCT/JP2004/013227
§ 371 (c)(1),
(2), (4) Date: Mar. 10, 2006

(87) PCT Pub. No.: WO2005/026574
PCT Pub. Date: Mar. 24, 2005

(65) Prior Publication Data
US 2007/0006393 A1    Jan. 11, 2007

(30) Foreign Application Priority Data
Sep. 10, 2003 (JP) .............................. 2003-317607
Jan. 29, 2004 (JP) .............................. 2004-021005

(51) Int. Cl.
*D06F 37/24* (2006.01)

(52) U.S. Cl. ........................................ 68/23.3; 384/624
(58) Field of Classification Search ................ 68/23.1, 68/23.3; 384/441, 535, 581, 624; 8/147; 188/378; 464/180
See application file for complete search history.

(56) References Cited

U.S. PATENT DOCUMENTS

| | | | | |
|---|---|---|---|---|
| 2,614,410 A | * | 10/1952 | Kirby | 68/23.3 |
| 2,797,569 A | * | 7/1957 | Kirby | 68/23.3 |
| 4,440,456 A | * | 4/1984 | Klusman | 384/581 X |
| 4,655,614 A | * | 4/1987 | Schott | 384/441 X |
| 6,325,546 B1 | * | 12/2001 | Storace | 384/624 X |

FOREIGN PATENT DOCUMENTS

| | | |
|---|---|---|
| JP | 55033939 | 3/1980 |
| JP | 5131075 | 5/1993 |
| JP | 6101730 | 4/1994 |

(Continued)

*Primary Examiner*—Greg Binda
(74) *Attorney, Agent, or Firm*—Finnegan, Henderson, Farabow, Garrett & Dunner, L.L.P.

(57) ABSTRACT

A device for damping runout vibration of a rotating shaft system at least including a rotating shaft and a rotating body rotatably supported by the shaft. A ring (24) is provided outside a bearing (23) fitted on a rotating shaft with a clearance between the ring and an outer ring of the bearing. A vibration damping mechanism includes, in order to suppress runout vibration of a rotating shaft system from the radially outside of the ring (24), a blade spring (25) compressed by a preload and a stopper (26) for setting an operation limit of the blade spring.

22 Claims, 22 Drawing Sheets

FOREIGN PATENT DOCUMENTS

| | | |
|---|---|---|
| JP | 7 88401 | 4/1995 |
| JP | 10-180147 | 7/1998 |
| JP | 11-207082 | 8/1999 |
| JP | 2003-144977 | 5/2003 |
| JP | 2003-166535 | 6/2003 |

* cited by examiner

DEVICE AND METHOD FOR DAMPING VIBRATION OF ROTATING SHAFT SYSTEM

FIELD OF THE INVENTION

This invention relates to a device and a method of vibration suppression of a rotating-shaft system.

BACKGROUND OF THE INVENTION

In rotating machinery, any imbalance of the involved rotating-shaft system induces significant vibrations near its primary critical speed. To suppress such vibrations, the rotating-shaft system may be balanced to cancel the imbalance inducing the vibrations.

No matter to what degree the imbalance is corrected, if any sympathetic vibration can be still produced, some procedure to suppress the vibration should be applied to the rotating shaft system. Up to the present, the prior-art of vibration control methods for a rotating-shaft system has been proposed as listed below.

The simplest method provides a suppressing effect by elastically suspending a bearing using an elastic body. For example, the elastic body employed in this method may a rubber vibration isolator as described in Tallian, T. E., and Gustafsson, O. G., *ASLE Trans.*, Vol. 8, 3 (1965), or a blade spring as described in Masayoshi Itoh, *Kikai Sekkei* [Machine Design] 6,12 (1962), 30. Kirk, R. G., and Gunter, E. J., *J. Engineering for Industry*, 2(1972), 221, and Ota, H., and Kanabe, Y., *J. Applied Mechanics*, Vol. 98, 1 (1976), 144, teach that a suppressing effect can be produced by applying the dynamic vibration absorber theory to an elastic suspended system.

Iwata, Nova, *Kiron* [Articles on Mechanical Engineering], 49-446, 10 (1983), 1897 realizes the specified values of the optimized parameters defined by the dynamic vibration absorber theory using an active control.

In the art of aircraft gas turbine engines, a squeezing film damper bearing is widely used to inhibit vibrations, as described in, e.g., Morton, P. G., *Proc. Instn. Mech. Eng.*, 180 (1965), 295, and Hirsch, F., and Childs, D., *Mech. Eng.* 5 (1984), 66.

Recently, an active vibration control of a rotating-shaft system, which is supported by a magnetic bearing using a variety of control theories, has been established, as described in, e.g., Japanese Patent Early-Publication No. 2003-166535.

In particular, methods of vibration suppression of a centrifugal separator have been developed and realized, as listed below.

1) As shown in Japanese Patent Early-Publication No. 07-088401, a separation cylinder is supported by a rotating shaft to be rotated like a pendulum. The rotating shaft is provided with a buffer device in which a hydraulic damper is combined with a rubber damper.
2) As shown in Japanese Patent Early-Publication No. 10-180147, a cylinder whose center axis is a rotation axis houses a plurality of balls. A ball balancer automatic corrects any imbalance by moving the balls.
3) Japanese Patent Early-Publication No. 2003-144977 discloses a means for stopping the rotation of a motor when a driving shaft jointed to a rotor contacts a vibration detector.

Further, methods of vibration suppression of a washing machine are being developed and realized, as listed below.

1) Japanese Patent Early-Publication No. 05-131075 discloses a method of vibration suppression of a washing machine. In this method, the damping force of a suspension, which supports a water tank of the washing machine, is varied by means of varying the damping force based on the output of a vibration sensor, which detects the vibrations of the washing machine.
2) Japanese Patent Early-Publication No. 11-207082 discloses a method of vibration suppression of a washing machine. In this method, the washing machine is suspended from a vibration isolator, which is provided with a hanging bar, an upper sliding member, and a sliding cylinder. On the inner periphery of the sliding cylinder, a viscoelastic material having thixotropic properties is used.

Unfortunately, the forgoing devices and methods of vibration suppression involve the disadvantages listed below.

1) Because the elastic constant of the rubber damper can be significantly varied as a result of variations in the age or temperature, controlling and maintaining the associated parameters with high precision involve difficulties.
2) To provide an elastically suspended structure with a bearing, the arrangements of the rotating machinery must be modified, and this results in complex arrangements. It may compromise the safety of the rotating machinery.
3) Even if the optimized values are determined based on the dynamic vibration absorber theory, controlling the parameters, typically, the damping coefficient, at the optimized values, involves difficulties.
4) The forgoing methods using the squeeze film damper bearing or the variety of control theories require complex and large devices and thus increase the cost if they are applied to common rotating machinery.
5) Because most of the forgoing methods are designed to suppress the steady-state vibration and thus to provide damping effects thereon, their advantages for unsteady-state vibrations are unknown.

Accordingly, there are needs to provide a device and a method that can readily suppress the vibrations of the rotating-shaft system by a simple arrangement without fine adjustments for the parameters.

SUMMARY OF THE INVENTION

As used herein, the term "rotating-shaft system" denotes a system that includes at least a rotating shaft and a rotor rotatively supported by it. The term "rotating machinery" denotes machinery that includes the rotating-shaft system. Such machinery in the present invention includes, but is not limited to, equipment, devices, systems, and their associated units, as widely used in various fields.

As used herein, the term "an elastic member that is compressed by applying a preloading pressure so as to suppress the whirling vibration of a rotating-shaft system" denotes an elastic member that has been subjected to a preloading pressure to discontinuously generate restoring forces. Herein such an elastic member often is also called "an auxiliary spring." The words "the auxiliary" of the term "the auxiliary spring" distinguish this auxiliary spring from the term "an inherent spring" of a solid revolution-system. The words "the auxiliary" also refer to a theoretical modal of the rigid body rotation the above elastic member.

As used herein, the term "discontinuous spring" denotes a spring whose restoring forces are not continuous.

One object of the present invention is to provide a device and a method for suppressing a whirling vibration of a rotating-shaft system that includes at least a rotating shaft and a rotor rotatively supported by the rotating shaft.

One aspect of the present invention provides such a device. The device comprises at least one anti-rotating casing for surrounding said rotating shaft such that the radial direction of the casing is substantially orthogonal to the rotating shaft, wherein said casing is arranged so that the whirling vibrations of the rotating-shaft system can be transferred to said housing, but wherein said casing cannot rotate;

means for suppressing the whirling vibrations; and wherein the means includes at least one elastic member that is compressed by applying a preloading pressure so as to suppress the whirling vibrations of the rotating-shaft system, wherein the elastic member is arranged to create a clearance within a predetermined range between the outer surface of the anti-rotating casing and the elastic member, and a stopper member for limiting the operating range of the elastic member.

The predetermined range of the clearance may be established by the elastic member alone or combined with the stopper member.

Another aspect of the present invention provides a device for suppressing whirling vibrations of a rotating-shaft system that includes at least a rotating shaft and a rotating rotor supported by the rotating shaft. The device comprises a first anti-rotating casing for surrounding the rotating shaft such that the radial direction of the casing is substantially orthogonal to the rotating shaft, wherein the casing is arranged so that the whirling vibration of the rotating-shaft system can be transferred to the housing, but wherein the casing cannot rotate;

a second anti-rotating casing placed laterally away from the first anti-rotating casing to create a clearance within the predetermined range between said first anti-rotating casing and the second anti-rotating casing;

suppressing means for suppressing the whirling vibrations; and wherein the suppressing means includes an elastic member that is compressed by applying a preloading pressure to suppress the whirling vibrations of the rotating-shaft system from the radius outward thereof, and a stopper member for limiting the operating range of the elastic member.

In the present invention, the anti-rotating casing depends on neither its shape nor its arrangement, if it has a function to inhibit the rotating shaft from contacting an elastic member or the second anti-rotating ring. For example, in some embodiments, although a bearing is employed as the anti-rotating casing, the bearing of the present invention does not use such a bearing to act in its common function to bear a load.

The anti-rotating casings may be a first anti-rotating ring and a second anti-rotating ring in a co-axial relation to each other. In this case, the predetermined clearance is formed between the periphery of the second anti-rotating ring and the elastic member. For example, if a commercially existing bearing is used as the first anti-rotating ring, the predetermined clearance between the bearing and a second anti-rotating ring can be readily configured.

The stopper member for limiting the operating range of the elastic member may be a mechanical stopper or an electrical stopper. The stopper member also acts to maintain the preloading pressure applied to the elastic member to provide the discontinuous characteristics of a spring to the elastic member.

The suppressing means that includes the elastic member and the stopper member may be plural. In this case, a difference in deflection or differences in deflection may be applied to the elastic members or the magnitude of the clearances, or both.

The clearance between the first anti-rotating casing and the second anti-rotating casing is the predetermined gap space. Using this clearance, a restoring force to suppress the whirling vibrations can be discontinuously imparted.

Note that the device and the method of vibration suppression of the rotating-shaft system of the present invention is to suppress the whirling vibrations of the rotating-shaft system, but not to inhibit any of its reciprocating motions.

The forgoing and other objects and advantage of the present invention will be more apparent from the following detailed description and the accompanying drawings.

DETAILED DESCRIPTION OF THE EMBODIMENTS OF THE PRESENT INVENTION

Analytical, experimental, and applied devices and methods of whirling-vibration suppression of a rotating-shaft system of the present invention will now be explained together with their embodiments by reference to the accompanying drawings.

A First Embodiment

Figure 1A:
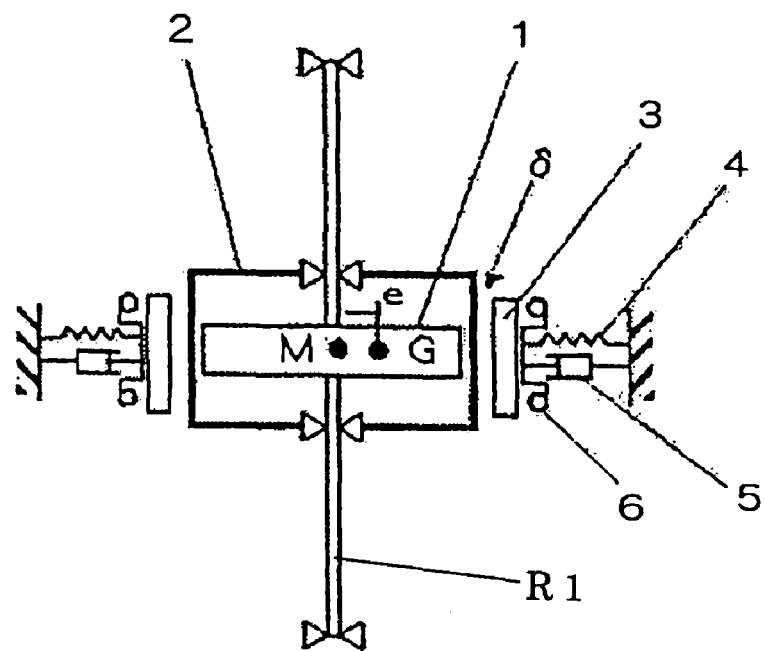
FIG. 1A shows a front view of an analytical model explaining the present invention.
Figure 1B:
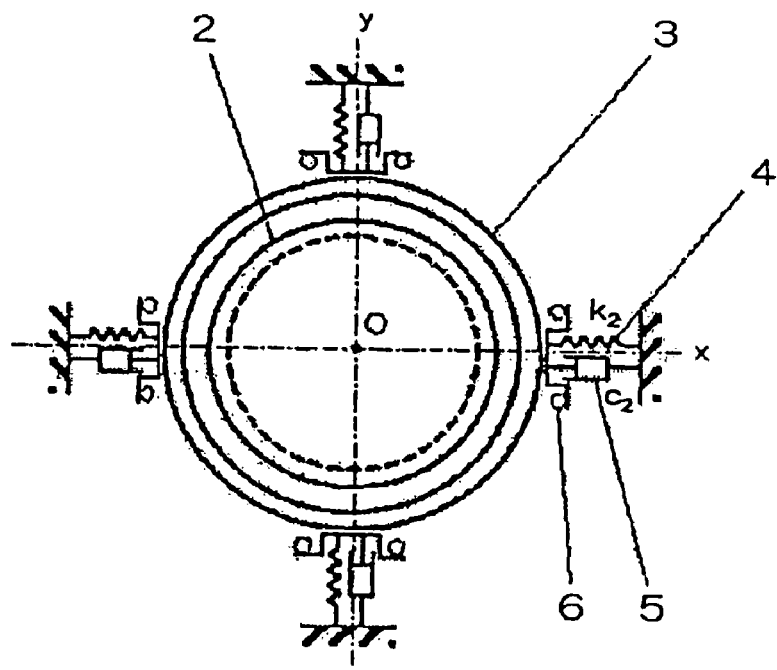
FIG. 1B shows a plane view of the model of FIG. 1A.

FIGS. 1A and 1B show a front view and a plane view of an analytical model of one device to suppress vibrations of the rotating-shaft system of the present invention. Now an analytical first embodiment using this analytical model will be described.

In FIGS. 1A and 1B, a rotor 1, which is rotationally supported by a rotating shaft R1 and rotates at a rotating velocity ω, is a Jeffcott rotor. The rotating shaft R1 and the Jeffcott rotor 1 constitute a rotating system. Enclosing the Jeffcott rotor 1 is an anti-rotating cylindrical casing (or housing) 2, which is arranged so that the whirling vibration of the rotating-shaft system can be transferred to the casing, but the casing cannot be rotated. A ring member (intermediate member) 3 is arranged to leave a clearance or a clearance δ for the periphery of the anti-rotating casing 2. In turn, a plurality of auxiliary springs (elastic members) 4 and auxiliary dampers 5 are arranged on the outside of the ring member 3.

Assume that the rotating shaft R1 is vertical, so that the effect of gravity on the subject can be ignored. The rotating shaft R1 is supported by a plurality of bearings (not shown).

Assume a Cartesian coordinate system O-xyz, where the z-axis is the normal line extending between the center of an uppermost bearing and a lowermost bearing, the x-axis is orthogonal to the z-axis in the surface of FIG. 1A, and the y-axis is orthogonal to the x-axis and the z-axis. The rotating shaft R1 can be deflected in the x-y plane. The coordinate of the geometric center of the Jeffcott rotor 1 is M (x, y). The direction of the radius (the x-axis) of the anti-rotating casing 2 is substantially orthogonal to the rotating shaft R.

Each auxiliary spring 4 has the discontinuous characteristics of a spring by compressing it to apply to it a preloading pressure. Four auxiliary springs 4 are provided outside the anti-rotating casing in the x-axis and the y-axis in this embodiment as shown in FIG. 1B. Each auxiliary spring 4 contacts the ring member 3 such that it is shrunk by δ from its original length. The operating limit of each auxiliary spring 4 is defined by a stopper (stopper member) 6 such that it can be further constricted, but cannot be further extended. If the Jeffcott rotor 1 moves in the positive direction (the right side of FIGS. 1A and 1B) in the x-axis, the anti-rotating casing 2 is contacted and pushed to the ring member 3 at x=δ. If the force pushing the ring member 3 increases above the preloading pressure k2 δ, the ring member 3 moves so as to constrict the right auxiliary spring 4 and to move away from the left auxiliary spring 4, which is subjected to no change in its length, and from the ring member 3.

Figure 2:
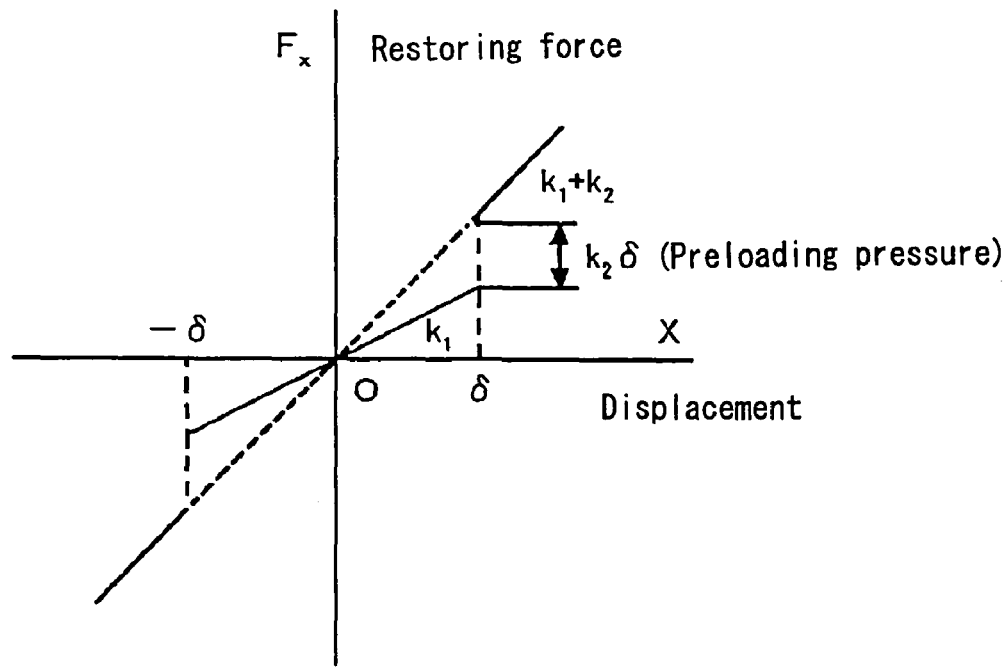
FIG. 2 is a graph showing a restoring force of the discontinuous characteristics of a spring.

FIG. 2 shows the restoring property of the auxiliary spring 4. Because the auxiliary spring is subjected to the preloading pressure, its spring property behaves as a discontinuous property, as shown in FIG. 2.

In the analytical model of this embodiment, the properties of the system are switched between a state that conforms to the relation r<δ and a state that conforms to the relation 0<r<δ, based on the displacement r{=√(x²+y²)} of the Jeffcott rotor. That is, the system is switched between a flexible spring system (the state that complies with the relation r<δ) and a rigid spring system (the state that complies with the relation 0<r<δ) at the border δr=.

If the Jeffcott rotor 1 whirls at a constant radius r, just one point of the spring property, as shown in FIG. 2, is available. Such a property differs from that of a reciprocal vibration system and thus it means that the method of the vibration suppression suggested herein is available only in the rotating-shaft system.

If the rotating shaft R1 moves, the spring force and the damping force generated by the auxiliary springs 4 and the auxiliary dampers 5 are expressed by $$F_{2x}=-k_{2x}x, F_{2y}=-k_{2y}y(r>\delta),$$

$$D_{2x}=-c_{2x}\dot{x}, D_{2y}=-c_{2y}\dot{y}(r>\delta), \text{ and}$$

$$F_{2x}=F_{2y}=D_{2x}=D_{2y}=0(r\leq\delta), \quad (1)$$

where $k_{2x}x$, $k_{2y}y$ are the spring constants of the auxiliary springs 4, and $c_{2x}x$, c2yy are the damping coefficients of the auxiliary dampers 5.

If the auxiliary springs 4 have no deflection difference therebetween, assume that $k_{2x}=k_{2y}(=k_2)$ and $c_{2x}=c_{2y}(=c_2)$. Now the dynamic equations will be described. If the anti-rotating casing 2 does not contact the ring member 3 (this state complies with the relation 0<r<δ), the dynamic equations of the Jeffcott rotor 1 are obtained. Using the static deflection $e_{st}$ generated when the Jeffcott rotor 1 is horizontally supported, the nondimensional parameters can be defined by $$x=x/e_{st}, y=y/e_{st}, t=t\sqrt{k_1/m}$$

$$\omega=\omega\sqrt{k_1/m}, e=e/e_{st}, c=c/\sqrt{mk_1} \quad (2)$$

where "m" denotes the combined masses of the Jeffcott rotor 1 and the anti-rotating casing 2, "e" denotes the static imbalance of the Jeffcott rotor 1, c denotes the damping coefficient, $k_1$ denotes the spring constant of the shaft, and co the rotational velocity.

Thus, the nondimensional dynamic equations of the Jeffcott rotor can be expressed by $$\ddot{x}+c\dot{x}+x=e\omega^2\cos\omega t$$

$$\ddot{y}+c\dot{y}+y=e\omega^2\sin\omega t \quad (3)$$

In the above equations, the signs of the nondimensional quantities are omitted. If the anti-rotating casing 2 contacts the ring member 3 (this state complies with the relation r≧δ), the force defined by equation (1) applies, and thus the dynamic equations can be expressed by $$\ddot{x}+c\dot{x}+x=e\omega^2\cos\omega t+F_{2x}+D_{2x}$$

$$\ddot{y}+c\dot{y}+y=e\omega^2\sin\omega t+F_{2y}+D_{2y} \quad (4)$$

In the above embodiment, the numerical model simulations in respect to cases with and without the preloading pressure will now be described.

In the case in which each auxiliary spring has no preloading pressure, the length of the auxiliary spring is shorter than that of the first embodiment by δ. Further, the stopper 6 was not used for such a shorter auxiliary spring. Accordingly, because each auxiliary spring 4 contacts the ring member 3 at its original length, it has no preloading pressure.

In this case, the restoring forces are continuous, although the spring constants are discontinuous. $F_{2x}$, $F_{2y}$, $D_{2x}$, and $D_{2y}$ are expressed by $$F_{2x}=k_{2x}(r-\delta)x/r F_{2y}=k_{2y}(r-\delta)y/r(r>\delta), \text{ and}$$

$$D_{2x}=c_{2x}\dot{r}x/r D_{2y}=c_{2y}\dot{r}y-\delta)y/r(r>\delta), \text{ and}$$

$$F_{2x}=k_{2x}=D_{2x}=D_{2y}=0(r\leq\delta). \quad (5)$$

Figure 3:
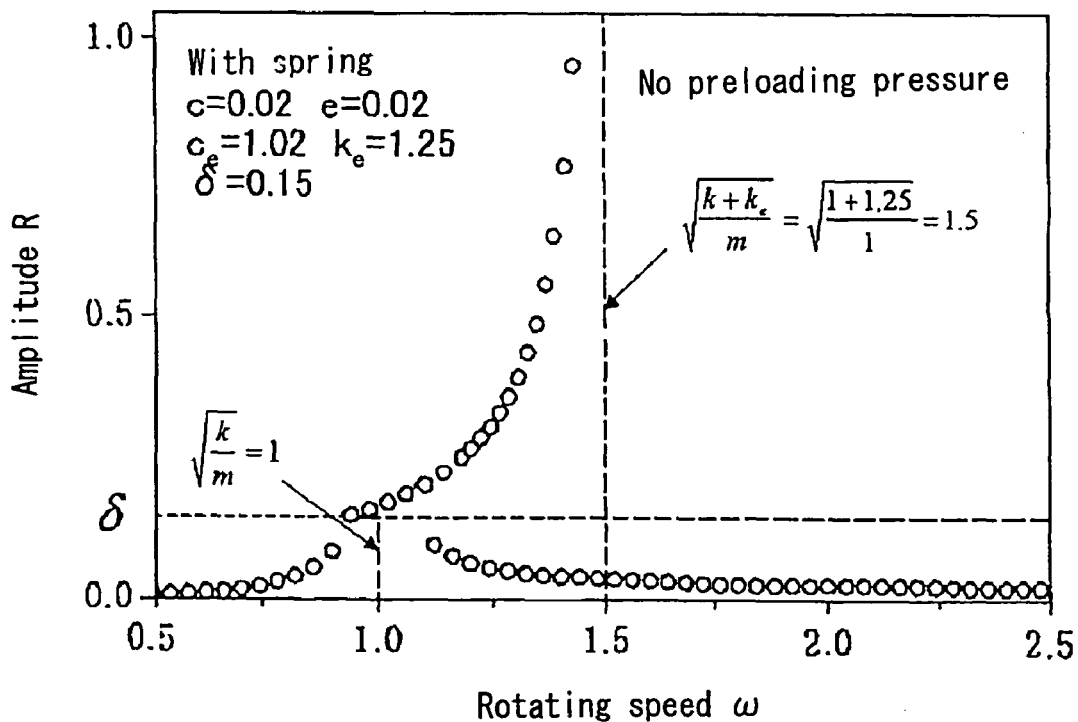
FIG. 3 is a graph showing the results that were calculated. They indicate vibrations that were able to be generated near the primary critical speed, where an auxiliary spring has no preloading pressure.

FIG. 3 shows analytical vibrations that may be generated near the critical speed based on the results calculated using Equation (5). The sympathetic vibrations as shown in FIG. 3 have the following properties:

(1) If r<δ, the system vibrates sympathetically near the resonance point ω=1.0. If the state is where r>δ, the system vibrates sympathetically near the resulting resonance point, which is considered to be, together with the auxiliary springs 4, ω=1.5

(2) The sympathetic vibration curve gradually forms the curve of the rigid spring system.

(3) The auxiliary springs 4 produce no effect to suppress the vibrations near the primary critical speed.

The case using the preloading pressure will now be discussed. This case corresponds to the state as shown in FIG. 2 of the first embodiment, in which the rotor restoring force of the Jeffcott rotor 1 has a discontinuous property. In this case, assume the auxiliary springs 4 have no deflection difference.

To introduce the principal equation of the rotor restoring force, it takes note of the resonance near the major critical speed. The solutions of the harmonic vibrations of O(εo) are assume to be the following:

$$x=R\cos(\omega t+\beta) \text{ and}$$

$$x=R\sin(\omega t+\beta). \quad (6)$$

Substituting Equation (1) for Equation (4), and equalizing the coefficients of the right-hand and left-hand sides of the terms of frequency ω with the order of accuracy of O(εo), the following equations regarding amplitude R and the phase angle β are obtained.

$$r_f\dot{R}=\omega^2ec_2\cos\beta-Rc_2G(\omega)-2\omega^3e\sin\beta$$

$$-2R\omega^2(c+c_2)$$

$$r_b\dot{\beta}=2\omega RG(\omega)-2\omega^3e\cos\beta-\omega^2ec_2\sin\beta$$

$$-Rcc_2\omega-Rc_2^2\omega \quad (7)$$

wherein $rf=c_2^2+4\omega^2$, $rb=R(c_2^2+4\omega^2)$, and $G(\omega)=1+k_2-\omega^2$.

In Equations (1-7), the stationary solution can be calculated by substituting 0 for the time differential of the left-hand side. The stability of the solution can be determined with the Routh-Hurwitz discrimination of stability.

The properties of the resonance curves and the effects to suppress the vibrations will now be explained by means of FIG. 4, which shows the resonance curves of the harmonic vibration components. The system of this embodiment can be switched between two states, based on whether the anti-rotating casing 2 contacts the auxiliary springs 4.

If r ≦δ the system vibrates in synchronization with w=√(k₁/m) (hereafter, the system in this state is called "system" 1), since the spring coefficients of the auxiliary springs 4 are sufficiently small, If r≧δ, the system vibrates at ω=√{(k₁+k₂)/m} (hereafter, the system in this state is called a "system 2"), since the stiffness of the auxiliary springs 4 is applied to the system.

Figure 4:
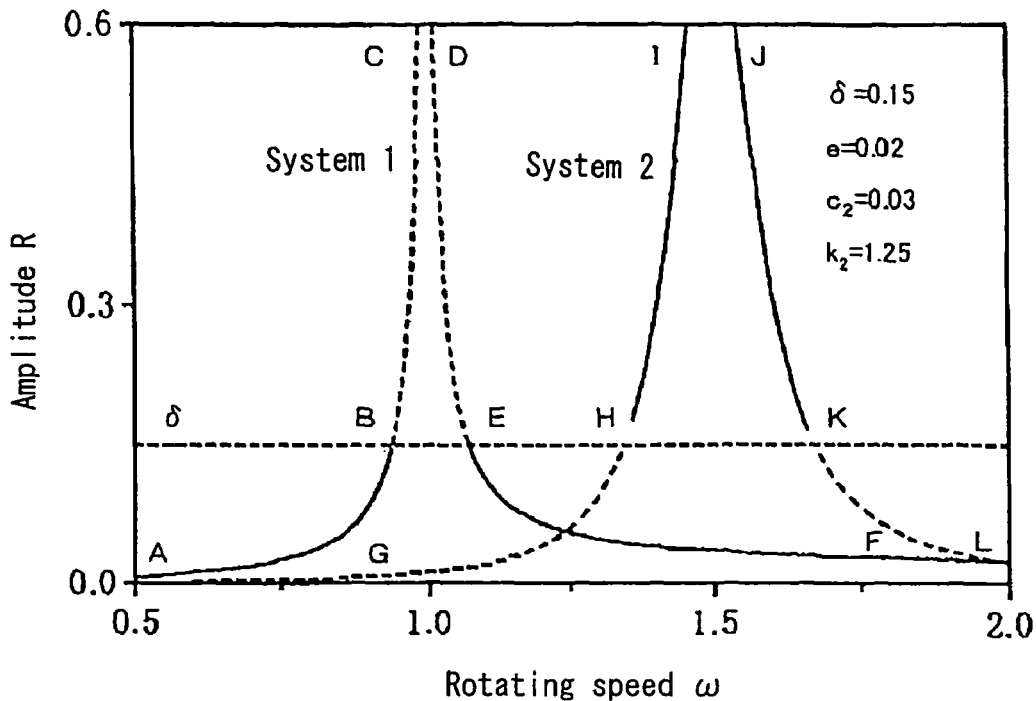
FIG. 4 is a graph showing the resonance curves of harmonic vibration components, where an auxiliary spring has a preloading pressure.

Although the resonance curve of the system 1 and the resonance curve of system 2 overlap in FIG. 4, the actually existing curves are shown in solid lines. The portions shown with the solid lines in FIG. 4 have been found to be static as a result of the discrimination of stability. The portions shown with the phantom lines in FIG. 4 indicate nonexistent resonance curves. The system uses the resonance curves of the system 1 if the amplitude is in a small range, and the resonance curves of the system 2 if the amplitude is in a large range. Using the auxiliary springs 4 produces forms of the resonance curves in which the top portions of them move to the side of the high-speed rotation.

By gradually increasing the rotation speed from the low rotation speed, the relation of r≦δ can be obtained in the segment between A and B, and thus the system then has an amplitude that is defined by the resonance curve A-B.

If the rotation speed is faster than at the point B, and if the amplitude is more than δ, the system moves to the system 2. Thus, the amplitude is reduced, since the resonance curve represents a convergence at G-H. If the amplitude is smaller than δ, the system moves to the system 1. Thus, it is expected that the amplitude may be increased, since the resonance curve represents a convergence at the curve B-C or D-E.

Accordingly, it is believed that the amplitude floats near the line that extends between point B and point E. If the rotation speed is then greater than the point E, it is expected that the amplitude may be changed to correspond to the stable resonance curve E-F (hereafter, "expected change in the amplitude").

Figure 5:
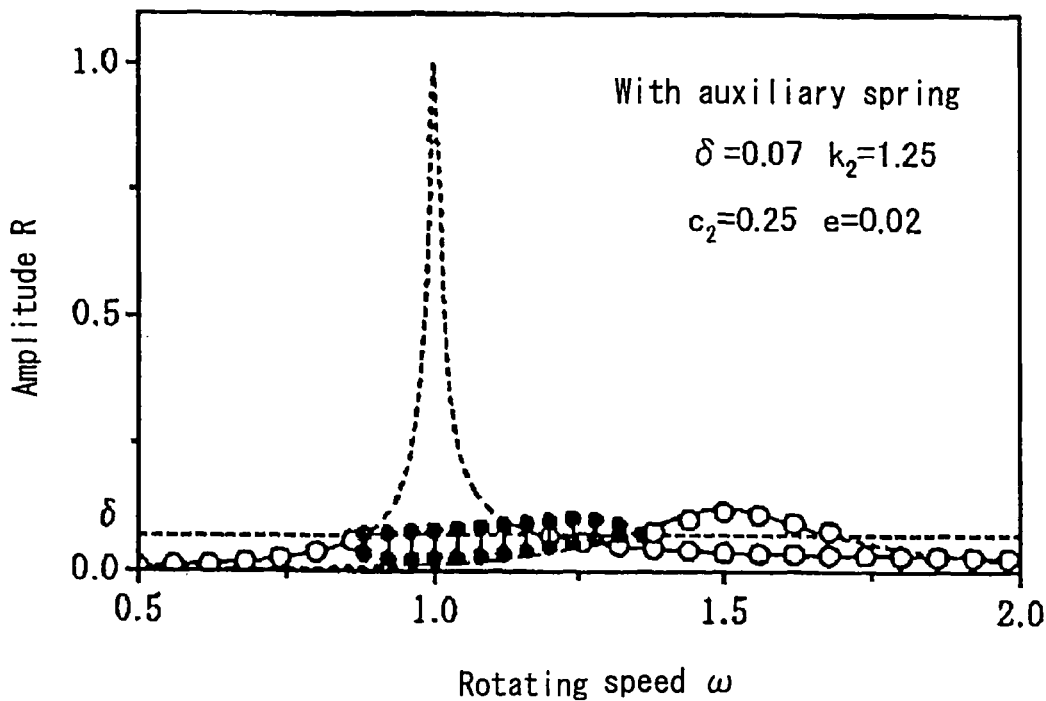
FIG. 5 is a graph showing the results of numerical model simulations, where an auxiliary spring has a preloading pressure.

The response of the case with the preloading pressure will now be explained using a numerical model simulation. The auxiliary dampers 5 are configured to increase their damping to decrease the peak of the sympathetic vibration of the state (the system 2) having the high rotation speed, in order to reduce the vibrations. FIG. 5 shows results of a numerical model simulation. The theoretical solutions are also superimposed and plotted in FIG. 5. The calculation uses a clearance δ=0.07. As can be seen from FIG. 5, the results of the theoretical analyses well correspond to the numerical integration values. However, in segment B-E, an almost periodic motion, whose range of variations of the amplitude is designated by the dots "•", is produced at the amplitude of substantially δ=0.07, and in line with the expected change in the amplitude in the immediately above paragraph. This vibration is continuously maintained even over the point E of FIG. 4. From the point H, the vibration then moves to the resonance curve of the high rotation speed of the system 2. When the resonance curve of the system 2 reaches the value of the clearance δ, the resonance curve is jumped to the resonance curve of the system 1, having the small amplitude.

Because it is difficult to configure or adjust the parameters of system 1 (the original system), assume that the magnitudes of the stiffness of the springs and the amplitudes of the system 2 (additive system) may be arbitrarily selected. As in the results as shown in FIG. 5, the amplitude of the system 1 should have a significantly large value, i.e., one that is substantially equal to 1. Because this value has been reduced to substantially equal 0.1, the effect of the method of the present invention can be appreciated. However, to suppress the vibrations, it is undesirable that the almost periodic motion be continuously maintained even over the point E, or be trapped within the peak of the resonance curve of the high rotation speed. The almost periodic motion also deviates from the expected behavior based on the expected change in the amplitude.

Figure 6:
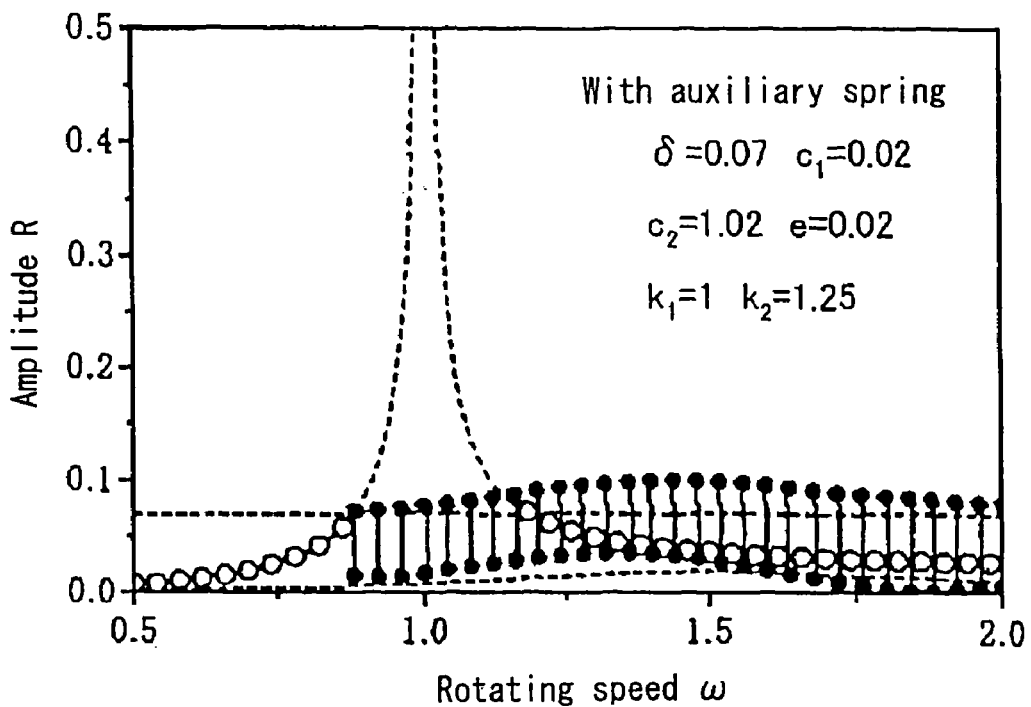
FIG. 6 is a graph showing the results of numerical model simulations similar to those of FIG. 5, but where the damping constant c2 is varied.

The influences of the parameters will now be discussed. To reduce the vibrations, it is considered that the damping coefficient c2 may be configured to a greater value, in order to lower the peak of the high rotation speed below the clearance δ. The results calculated by this consideration are shown in FIG. 6. These results, however, indicate that the range in which the almost periodic motion can be produced is significantly widespread. For one aspect of damping the vibrations, it is an undesirable phenomenon that the almost periodic motion can be generated at a speed that should be a range wherein harmonic vibrations have a small amplitude.

Figure 7:
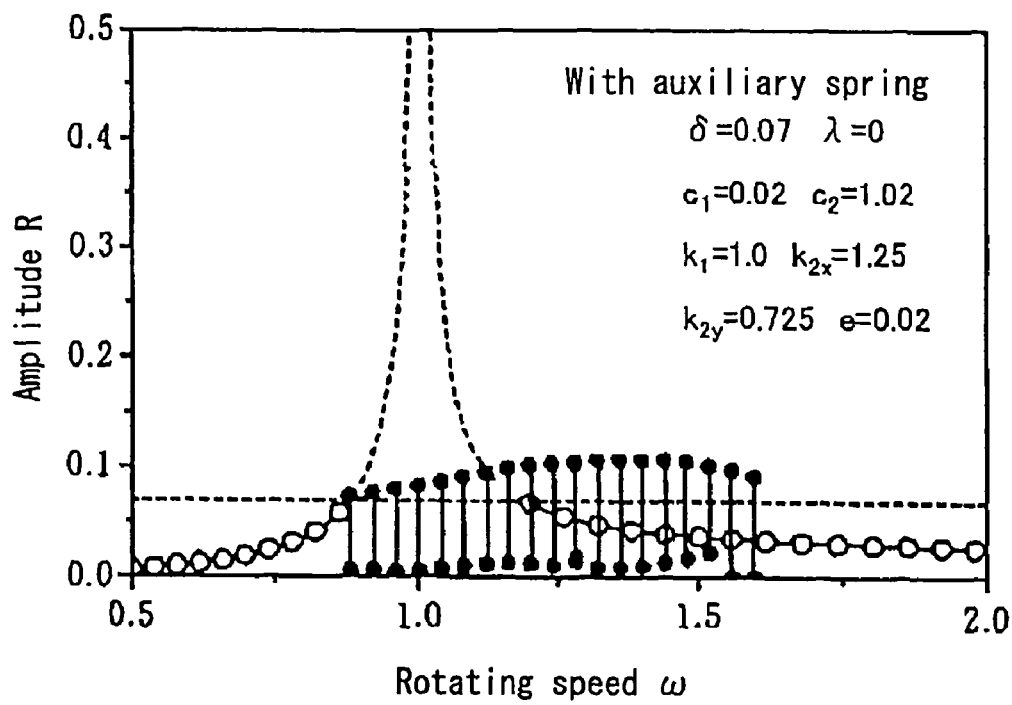
FIG. 7 is a graph showing the results of numerical model simulations, where an auxiliary spring has a difference in deflection in its stiffness.

The system in which the stiffness of the auxiliary springs has a deflection difference will now be discussed. To rid the system from the almost periodic motion that can be generated to the point at the high rotating speed point, a deflection difference is provided with the stiffness of the auxiliary springs to depart from a circular orbit. FIG. 7 shows results calculated using the deflection differences $k_{2x}/k_{2y}$–1.7. As can be seen from FIG. 7, the deflection differences cause an almost a periodic motion that can vanish midway, and thus the solution can rapidly progress to the stability solution of the small amplitude.

Figure 8:
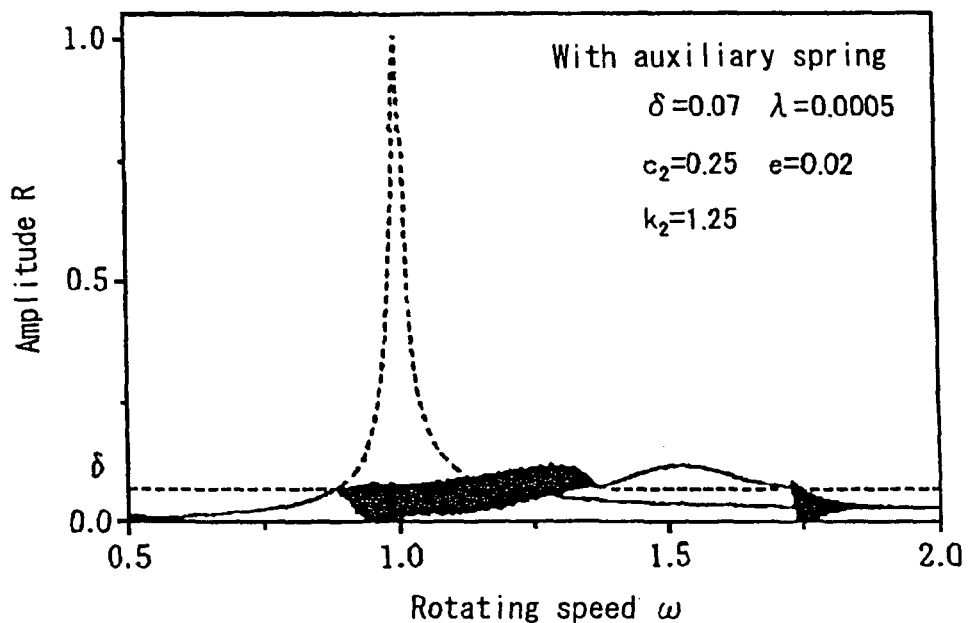
FIG. 8 is a graph showing the results that were calculated of unsteady vibrations.

Unsteady vibrations will now be discussed. To examine what happens when the system passes through the resonance point near the major critical speed at the constant angular acceleration, the equation (4) is numerically calculated using the conditions defined by the following equations.

$$\ddot{\Phi}=\lambda, \dot{\Phi}=\lambda t+\omega_0, \Phi=(½)\lambda t^2+\omega_0 t+\Phi_0 \qquad (8)$$

where λ is the acceleration velocity, Φ is the direction angle, which is measured from the x-axis of the imbalance, $\omega_0$ is the rotating speed at the beginning of the acceleration, and $\Phi_0$ is the angular location of the dynamic imbalance at the beginning of the acceleration. An example of the calculated result is shown in FIG. 8. The initial values are input at $\omega_0$=0.5 and $\Phi_0$=0. The sympathetic vibration curve of the steady vibration that corresponds to this example is that shown in FIG. 5. It should be appreciated that the damping method of the present invention also has a beneficial effect on the unsteady vibration.

A Second Embodiment

Figure 9A:
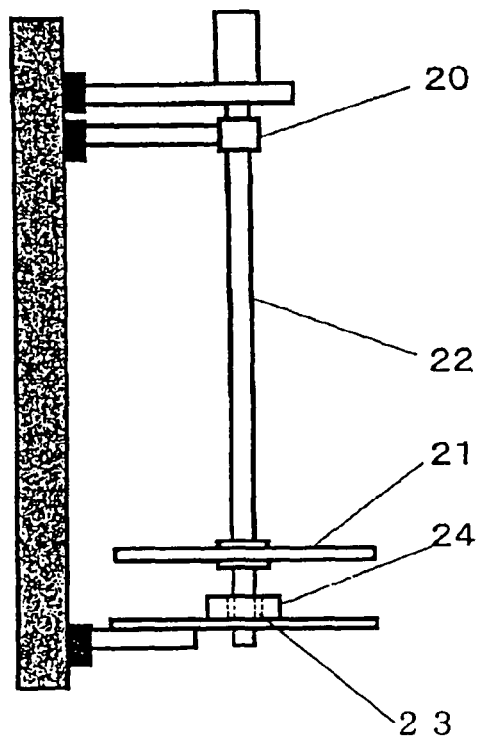
FIG. 9A schematically illustrates an experimental device that is used in a first embodiment of the present invention.
Figure 9B:
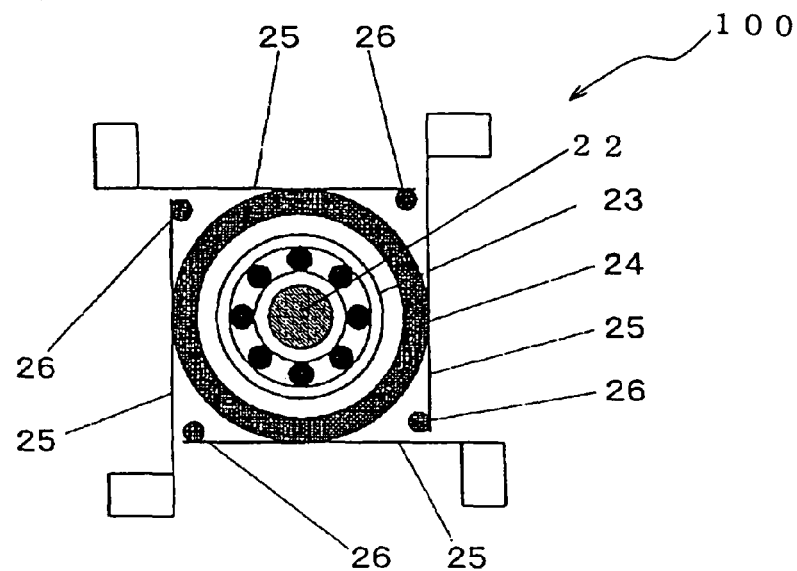
FIG. 9B is a schematic plane view of the damping mechanism for the suppression of vibrations in the device of FIG. 9A with a partially sectional view of the mechanism.

A device of vibration suppression of the rotating-shaft system of the second embodiment of the present invention will now be described together with its experiments. FIGS. 9A and 9B schematically illustrate the suppressing device used in the experiments. In the suppressing device, generally designated by 100, of the present invention, the upper end and the vicinity of the lower end of an overhanging shaft 22, which is composed of elastic material, are supported by an upper bearing 20 and a lower bearing 23. A disc 21 is co-axially fitted on the overhanging shaft 22 at the position between the upper bearing 20 and the lower bearing 23, but approximately near the latter bearing. The periphery of the outer ring of the lower bearing 23 corresponds to the anti-rotating casing 2 in the analytical model in the first embodiment. A ring 24 is co-axially arranged on the periphery of the outer ring of the lower bearing 23 to form a predetermined clearance δ therebetween (FIG. 9B). Four sets of blade springs (elastic members) 25, whose proximal ends are attached to four respective fixed positions on the outside of the ring 24, are extended such that they contact the periphery of the ring 24 to suppress the vibrations of the ring 24. Accordingly, the blade springs 25 allow the damping to cause a dry friction between each blade spring 25 and the ring 24. The four sets of the blade springs 25 are compressed the predetermined preloading pressure. The distal end of each blade spring 25 is provided with a stopper 26 to limit the operating range of the blade spring 25 to maintain the preloading pressure.

In this experiment, the overhanging shaft 22 has a length of l=700 mm and a diameter of d=12 mm, and the disc 21 has a diameter of 260 mm and a thickness of 10 mm. The lower portion of the overhanging shaft 22 is extended below the disc 21 by approximately 60 mm, and is fitted in a ball bearing (#6205), which acts as the lower bearing 23. A clearance of δ=2 mm is formed between the outer ring of the lower bearing 23 and the ring 24. As described below, experiments are carried out with the above suppressing device 100, while the experiment conditions are modified.

Figure 10:
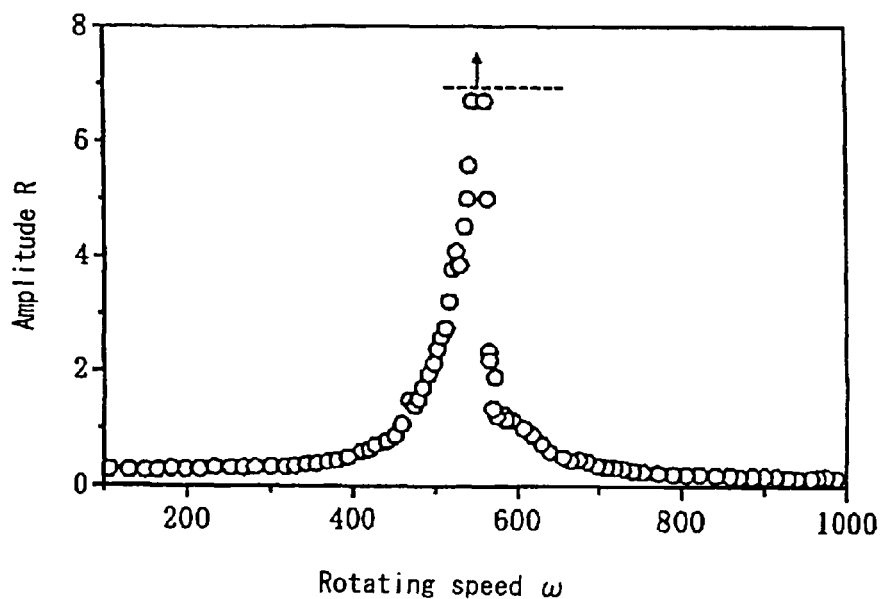
FIG. 10 is a graph showing resonance curves, using the device of FIG. 9A with no auxiliary spring.

For the sake of comparison, FIG. 10 shows the resonance curve of a reference device that is similar to the suppressing device 100, but where the blade springs 25 (and the stoppers 26) are removed. As can be seen from FIG. 10, a significant resonance is generated near the major critical speed. From a safety standpoint, this referenced experiment stopped when the magnitude of the amplitude reached of 7 mm.

For the suppressing device 100, which has the blade springs 25 (and the stoppers 26), of the present invention, experiments are carried out where the blade springs have a deflection difference and where they have no deflection difference.

Figure 11:
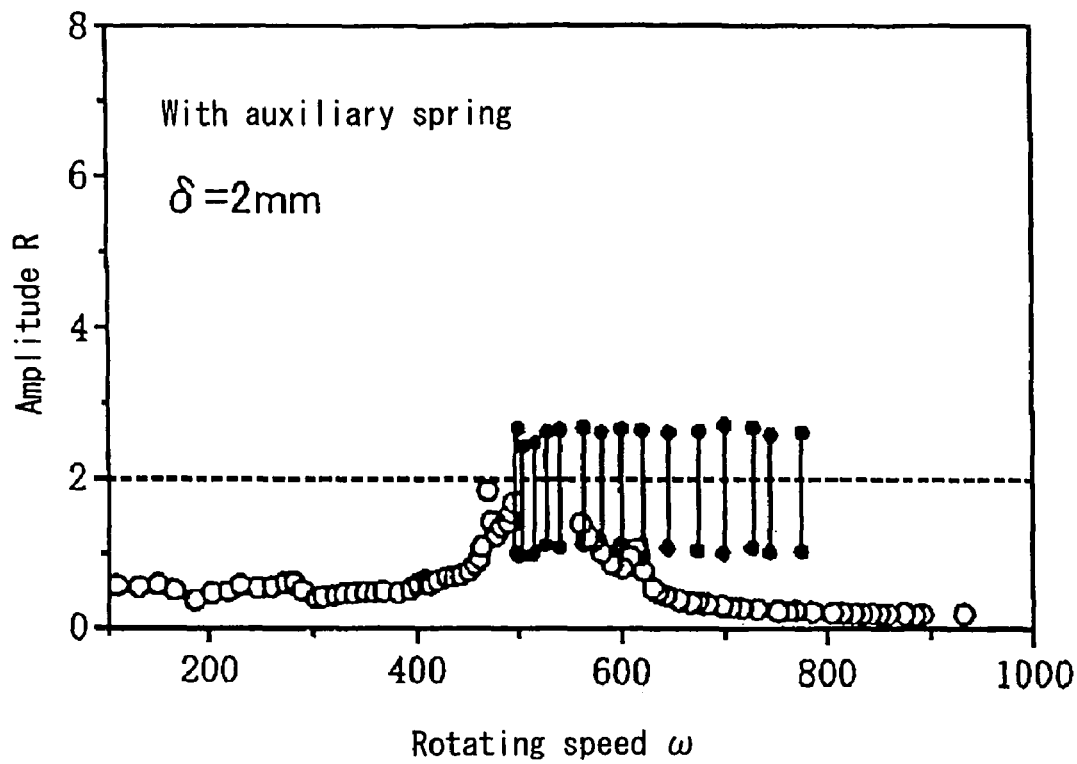
FIG. 11 is a graph showing resonance curves, using the device of FIG. 9A with an auxiliary spring that has a preloading pressure.

FIG. 11 shows the resulting resonance curve of the device in which the blade springs 25 have no deflection difference. As can be seen from FIG. 11, the resulting vibration near the major critical speed is now reduced to the level of about 2 mm, although the corresponding level of FIG. 10 was 8 mm or more. The resulting vibration moves from the major critical speed to the area of the high speeds, and almost periodic motions, whose magnitude is similar to that of the clearance of δ, are generated in the expanded domains. This experimental result qualitatively well conforms to the above theoretical analysis of FIG. 6. From a safety standpoint, the uppermost value of ω was put at about ω≈800 rpm in this experiment.

Figure 12:
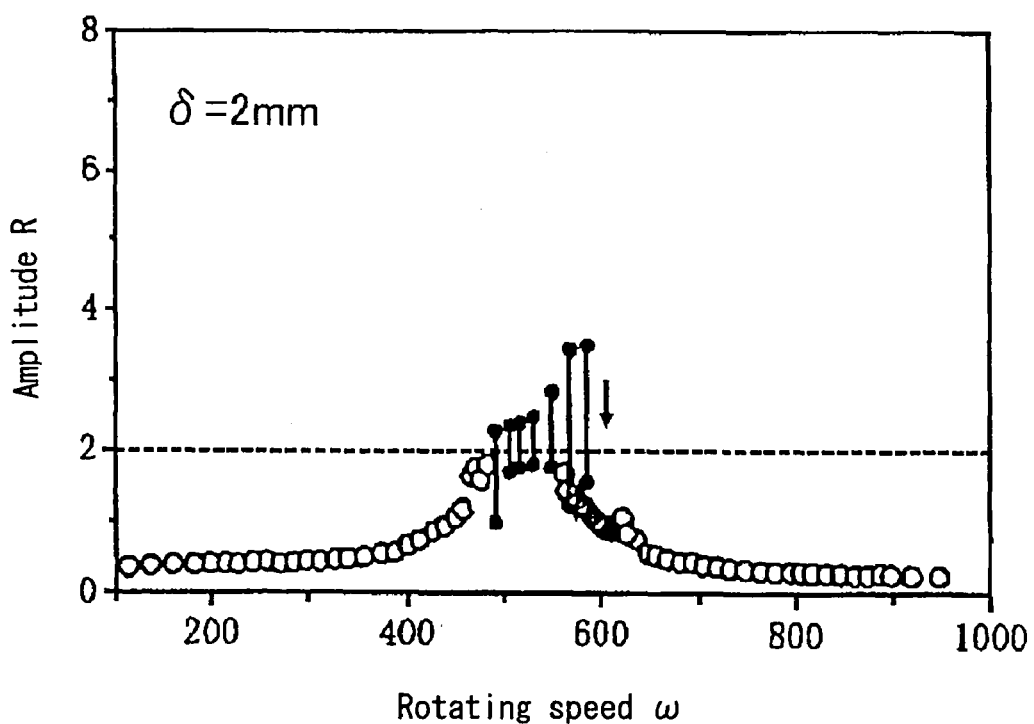
FIG. 12 is a graph showing resonance curves, using the device of FIG. 9A, where the number of blade springs of the auxiliary spring is varied.

FIG. 12 shows the resulting resonance curve of the device in which the blade springs 25 have a deflection difference caused by modifying the number of blade springs 25 between the x direction and the y direction. The periodic motions almost dissapear at the point immediately beyond the resonance point. The resonance curve rapidly progresses to the stable resonance curve (the stationary solutions of the harmonic vibrations) having small amplitudes in the area of the high rotating speeds. The domains in which the almost periodic motions are generated are significantly narrowed. Because the magnitude of the amplitude is also reduced to the level of about 2 mm, the effect on the damping vibrations can be appreciated. This experimental result well conforms to the above theoretical analysis of FIG. 7. The magnitude of the whirling vibration can be limited to any desirable value by modifying the clearance, without needing any fine adjustments of the parameters.

Although this embodiment employs the blade-spring assemblies 25 as the auxiliary springs, and modifies the number of blade-spring assemblies 25 between the x direction and the y direction so as to generate the deflection difference, an alternative way may provide a deflection difference. The blade-spring assembly, however, has significant advantages in that it just needs small spaces in the radial directions, friction can be generated by layering the blade-spring assembly, and there is no need for a greater dashpot.

In the present invention, the elastic members (the blade-spring assembly in this embodiment), or the size of the clearance, or both, can be provided with the deflection difference(s). With the deflection difference, the vibration in the circular orbit can be rapidly reduced to control the almost periodic motion (the whirling vibration) so that it rapidly converges. Because the meaning of providing with the deflection difference is to break up a profile of an orbit of the whirling vibration, it can be achieved by, e.g., the elastic members, or the clearance, or both. To provide a deflection difference with the elastic members, the following may be used, as, for example, 1) a difference in the strengths of a plurality of the elastic members, 2) a difference in the number of elastic members to be arranged in directions (e.g., two orthogonal directions) in which the elastic members are extended, and 3) arranging a plurality of elastic members such that different intervals (clearances) are formed between the periphery of the anti-rotating casing and the elastic members.

To provide the deflection difference with the clearance, for example, the clearance is designed such that a profile of its inner circumference does not form a concentric circle with a profile of its outer circumference. For example, the first anti-rotating ring may be a bearing whose outer ring has a circular cross-section. If such a bearing is eccentrically arranged on the second anti-rotating ring, the inner profile (the circular periphery of the outer ring of the bearing) of the clearance forms an eccentric circle with the inner profile (the inner circumference of the second anti-rotating ring) of the clearance. Thus, the deflection difference can be provided with the clearance. Further, if the outer profile of the clearance forms a circle, while the inner profile of the clearance forms an ellipsoid, the deflection difference can be provided. However, the means to provide the deflection difference are not limited to these means.

As the modifications of the second embodiment, alternative means on provide the deflection difference with the auxiliary springs are schematically shown in the plane views of FIGS. 13-16.

Figure 13:
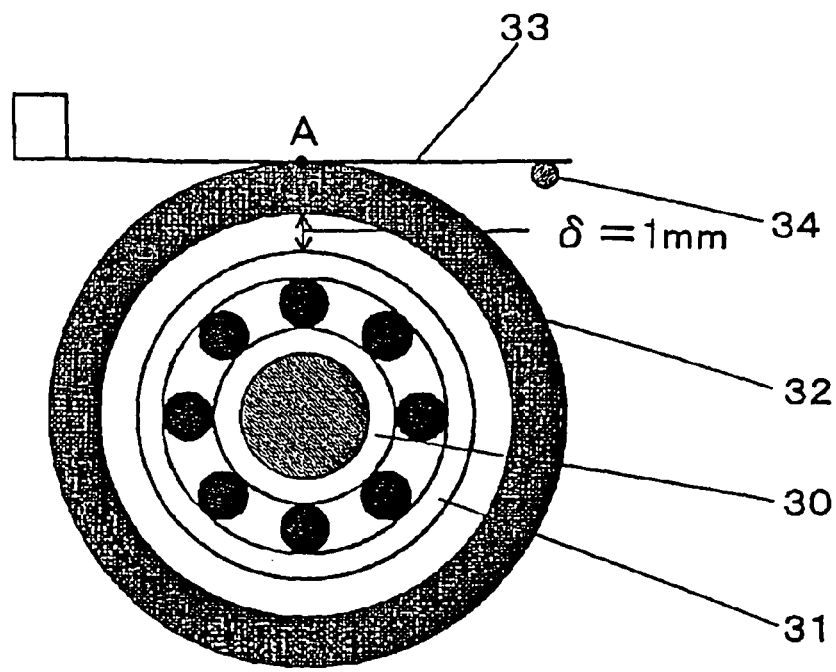
FIG. 13 is a schematic diagram of a damping mechanism, where the mechanism has a difference in the deflection that differs from that of a similar mechanism, shown in FIG. 9B.

In the arrangement as shown in FIG. 13, a preloading pressure is applied to an auxiliary-spring assembly. The periphery of a rotating shaft 30 is supported by a bearing 31. In turn, a ring 32 is co-axially arranged such that a clearance of δ=1 mm is formed between the periphery of the outer ring of the bearing 31 and the ring 32. One set of a blade-spring assembly (elastic members) 33, whose proximal end is attached to one fixed position in the outside of the ring 32, is extended in the x-axis, which lies on the horizontal direction in the drawing, such that it contacts the periphery of the ring 32 to suppress the flexional vibration of the ring 32. A preloading pressure is applied to the blade-spring assembly 33. The distal end of the blade-spring assembly 33 is provided with one stopper 34 so as to limit the operating range of the assembly 33, to maintain the preloading pressure.

Figure 14:
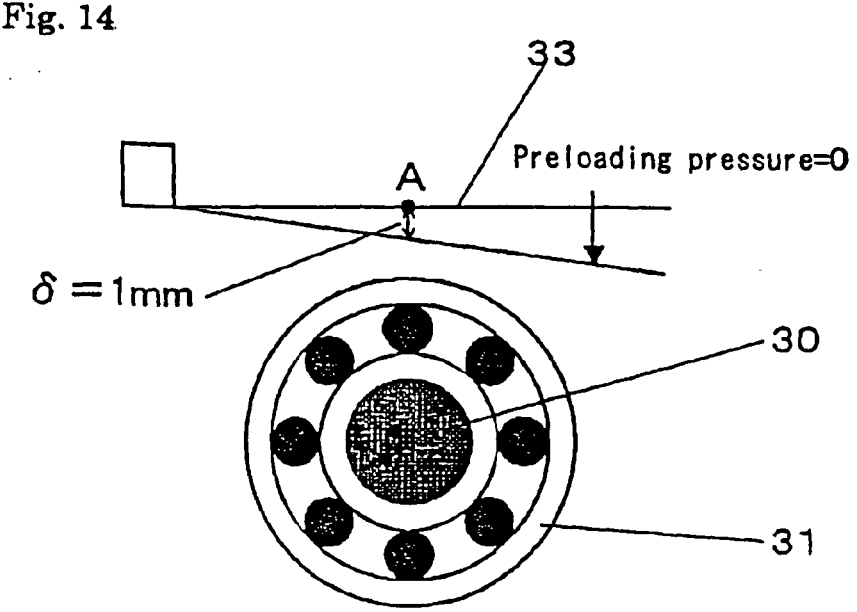
FIG. 14 is a schematic diagram of the damping mechanism of FIG. 13 where the rings are removed, where no preloading pressure is applied.

In the arrangement as shown in FIG. 14, the ring 32 and the stopper 34 of the blade-spring assembly 33 of FIG. 13 are removed. In this arrangement, because the blade-spring assembly 33 is restored, a displacement corresponding to the clearance of δ=1 mm is formed at a point A on the blade-spring assembly 33.

In the arrangement as shown in FIG. 14B, the distal end of the blade-spring assembly 33 of FIG. 13 is provided with the stopper 34, and a preloading pressure is applied to the blade-spring assembly.

Figure 15:
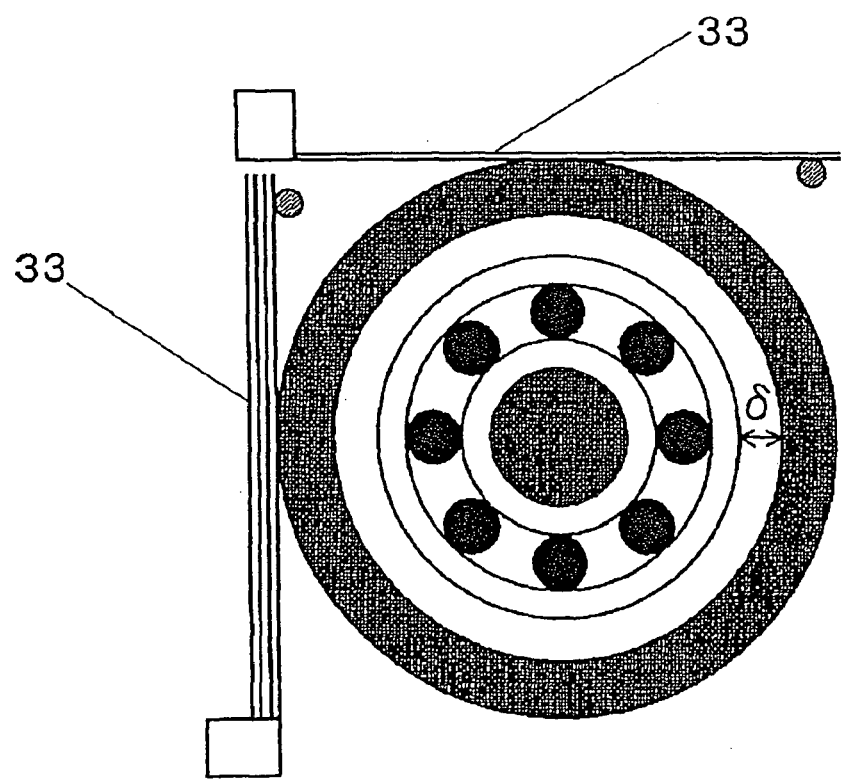
FIG. 15 is a schematic diagram of the damping mechanism of FIG. 13, where the number of springs is varied.
Figure 16:
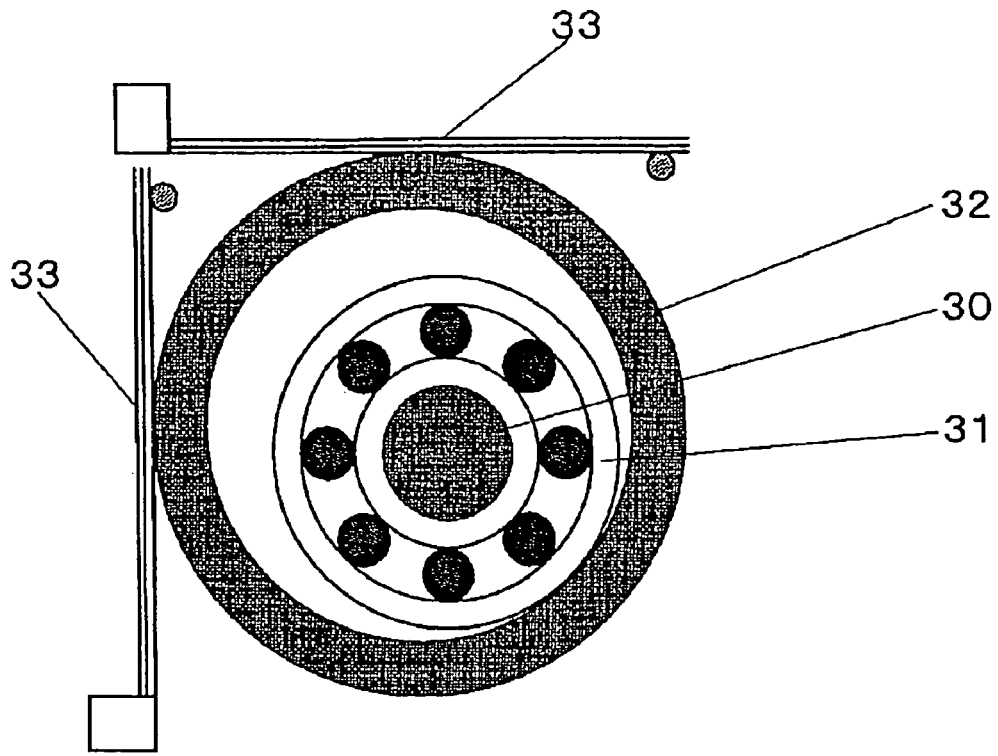
FIG. 16 is another schematic diagram of the damping mechanism of FIG. 13, where the number of springs is varied.

In FIGS. 15 and 16, a preloading pressure is applied to an optional blade-spring assembly 33, which is similar to the assembly of FIG. 13. The optional blade-spring assembly 33 is arranged in the y-axis, which runs in the vertical direction on the drawings, as well as the assembly of FIG. 13 being arranged in the x-axis. The optional assembly 33 and the assembly 33 have a deflection difference between them. It is caused by varying the number of their blade springs.

In the arrangement as shown in FIG. 15, the blade-spring assembly 33 in the x-axis includes two blade springs that are stacked, while the blade-spring assembly 33 in the y-axis includes four blade springs that are stacked. Accordingly, a deflection difference is provided between the assembly 33 in the x-axis and the assembly 33 in the y-axis.

Figure 17:
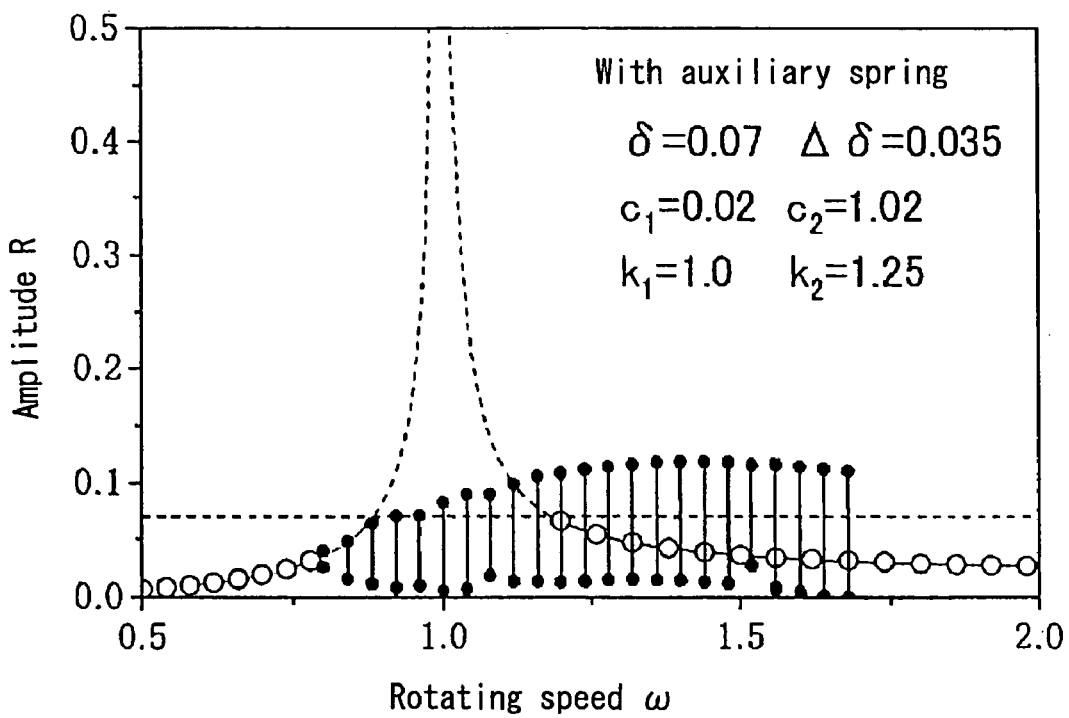
FIG. 17 is a graph the showing the results of numerical model simulations, where the center of the shaft is moved to vary the clearance.

In FIG. 16, the blade-spring assembly 33 in the x-axis includes three blade springs that are stacked, while the blade-spring assembly 33 in the y-axis also includes three blade springs that are stacked, and thus no deflection difference is formed between the assembly in the x-axis and the assembly in the y-axis. However, if the center axis of the shaft 30 moves, the outer ring of the bearing 31, which supports the shaft 30, contacts the inner surface of the ring 32 to vary the clearance between the outer ring of the bearing 31 and the ring 32. As shown in FIG. 17, the experimental result of such a case approximates the theoretical analysis as shown in FIG. 7.

The Third Embodiment

An embodiment in which the present invention is used for a washing machine will now be described in comparison to the prior art.

Figure 18:
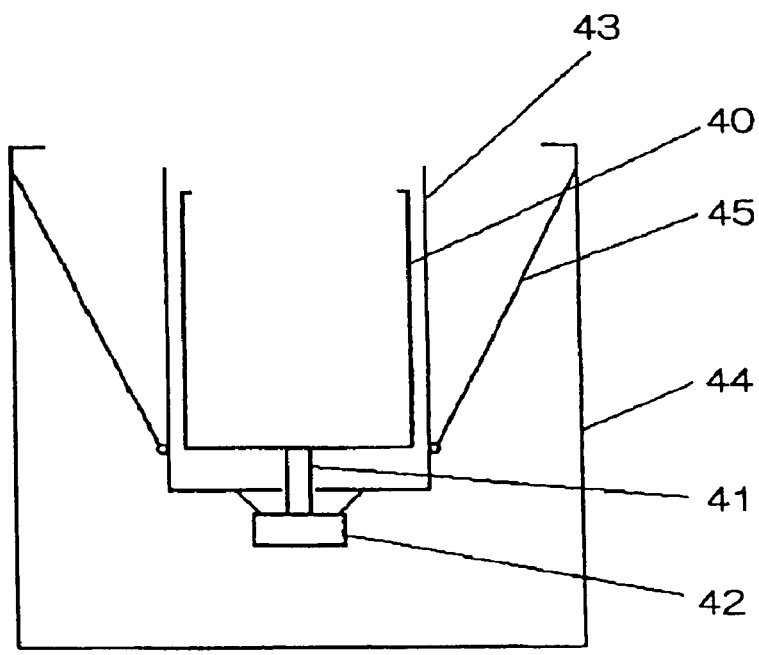
FIG. 18 schematically illustrates a prior-art washing machine.

FIG. 18 schematically illustrates a prior-art washing machine in which a washing tub 40 is drivingly connected to a motor 42 via a rotating shaft 41 and reduction gears (not shown) for transmitting a rotational motion. On the outside of the washing tub 40, a lateral cistern 43 for receiving drainage from the washing tub 40 is located such that the washing tub 40 can be rotated within the cistern 43. To insulate vibrations, the cistern 43 is suspended from a cabinet 44 by connecting the lower lateral sides of the cistern 43 with the upper lateral sides of the cabinet 44 via wires 45.

The embodiment in which the present invention is applied to a washing machine is shown in FIGS. 19A-19D. Like the prior art in FIG. 18, in FIGS. 19A, 19B, and 19C the washing tub 40 is drivingly connected to the motor 42 via the rotating shaft 41 and reduction gears (not shown) for transmitting the rotational motion. In this embodiment, however, a shaft 46 is fixed to and extended downward from the bottom of a housing of the motor 42 such that the shaft 46 cannot be rotated. On the outside of the shaft 46, a ring 47 has a co-axial relation with the shaft 46 such that a clearance of δ is formed therebetween. On the outside of the ring 47, auxiliary springs (elastic members) 48 and auxiliary dampers (damping members) 49 are, in turn, arranged. Each auxiliary spring 48 is provided with a stopper (stopper member) 50.

Figure 19A:
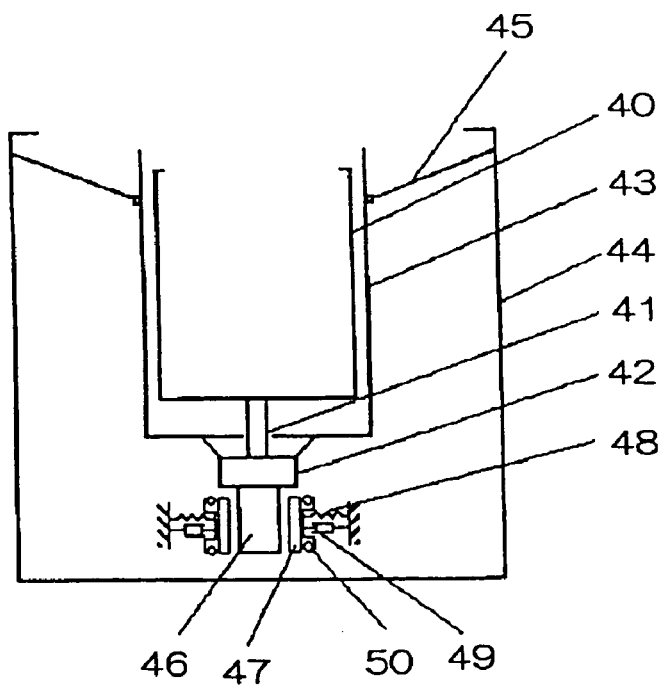
FIG. 19A schematically illustrates one embodiment of a washing machine, in which the suppressing device of the present invention is used.
Figure 19B:
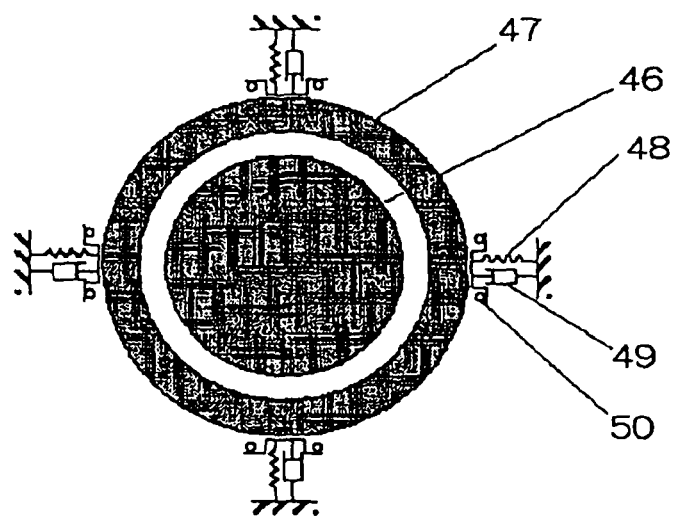
FIG. 19B is a schematic plane view of the damping mechanism for suppression of vibrations in the washing machine of FIG. 19A with a partially sectional view of the mechanism.
Figure 19C:
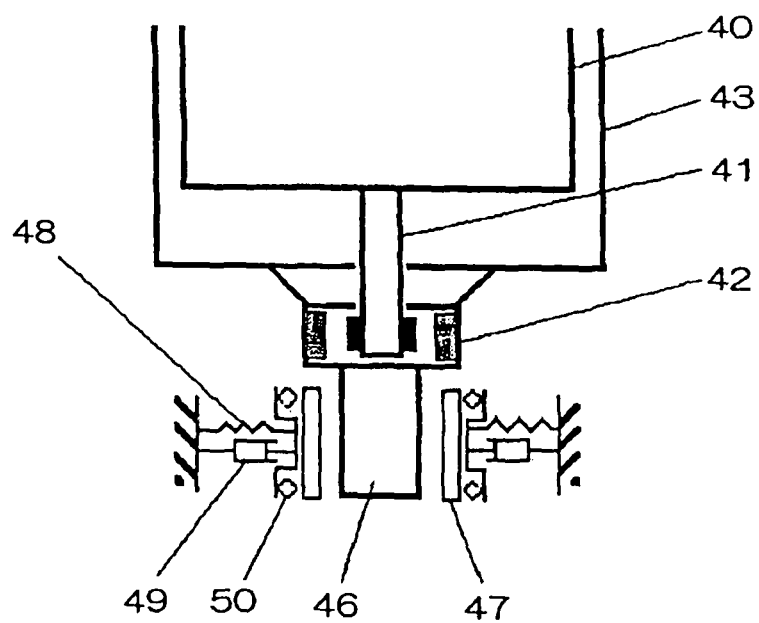
FIG. 19C is a schematic elevational view of the damping mechanism in the washing machine of FIG. 19A showing the detailed construction of the mechanism.
Figure 19D:
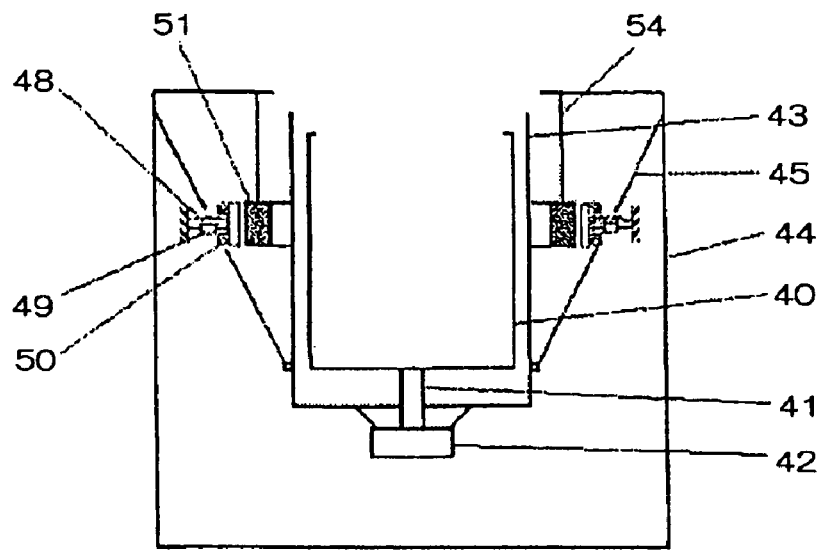
FIG. 19D schematically illustrates another embodiment of the present invention, where the damping mechanism is located on a different site than that shown in FIG. 19A.
Figure 19E:
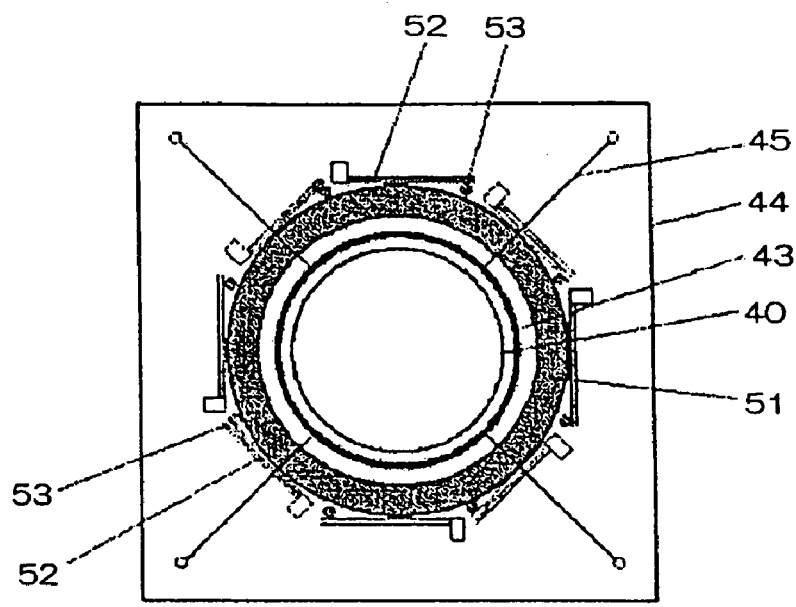
FIG. 19E is a schematic plane view of the damping mechanism in the washing machine of FIG. 19D with a partially sectional view of the mechanism.

FIGS. 19D and 19E show an alternative embodiment in which damping mechanisms are arranged on sites that are on the outside of the lateral cistern 43, in contrast to those shown in FIG. 19A. In FIGS. 19D and 19E, on the outside of the cistern 43, a ring 51 has a co-axial relation with it such that a clearance of δ (FIG. 19E) is formed therebetween. Arranged on the outside of the ring 51 is a plurality of blade-spring assemblies 52, which can act to function as both the auxiliary springs (elastic members) 48 and the auxiliary dampers (damping members) 49. Each blade-spring assembly 52 is provided with a stopper (stopper member) 53. The ring 51 is suspended from the upper portion of the cabinet 44 by means of wires 54.

Although eight blade-spring assemblies 52 are equally spaced around the periphery of the ring 51 in the illustrative embodiment, any desirable number of the assemblies 52 may also be arranged.

The lateral cistern 43, the cabinet 44, and the wires 45 are the same as those in the prior art as shown in FIG. 18.

The third embodiment can dampen the whirling vibration that is generated when the washing machine is stopped, using simple arrangements. Because the arrangements around the rotating shaft 41 of the motor 42 can be compact, a plurality of blade-spring assemblies can function as both the elastic members and the damping members, without a need to use a larger dashpot.

The Fourth Embodiment

Figure 20A:
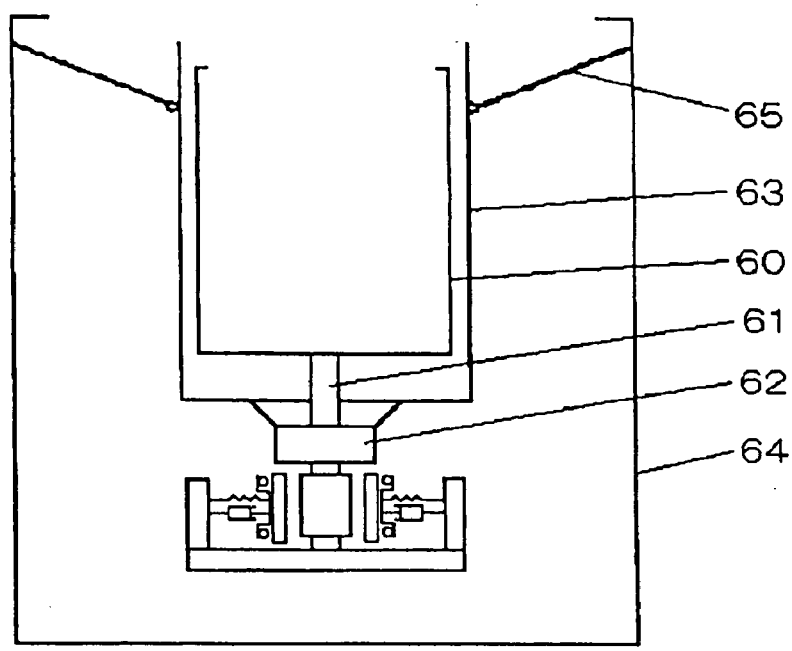
FIG. 20A schematically illustrates another embodiment of the washing machine, in which the suppressing device of the present invention is used.

In another embodiment, the present invention is also applied to a washing machine. In the washing machine as shown in FIG. 20A, a washing tub 60 is drivingly connected to a motor 62 via a rotating shaft 61 and reduction gears for transmitting the rotational motion. On the outside of the washing tub 60, a lateral cistern 63 for receiving drainage therefrom is located such that the washing tub 60 can be rotated within the cistern 63. To insulate the tub 60 from vibrations, the cistern 63 is suspended from a cabinet 64 by connecting the lower lateral sides of the cistern 63 with the upper lateral sides of the cabinet 64 via wires 65.

Figure 20B:
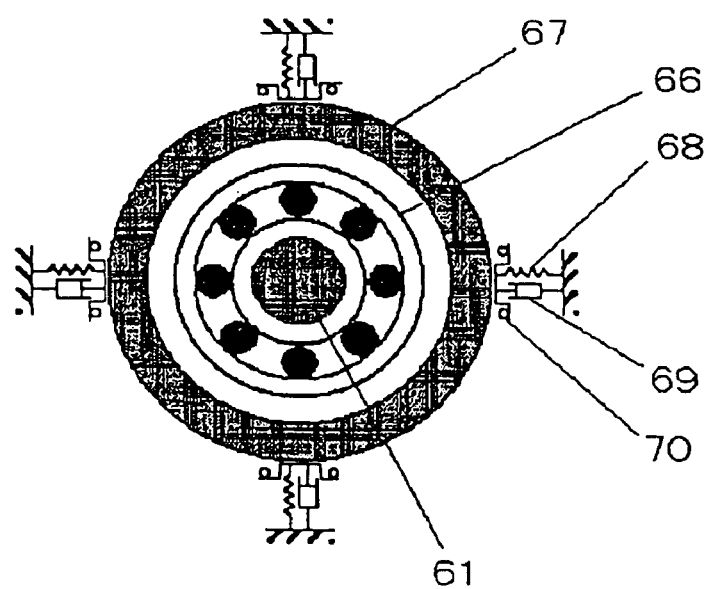
FIG. 20B is a schematic plane view of the damping mechanism in the washing machine of FIG. 20A, with a partially sectional view of the mechanism.

In FIGS. 20A and 20B, the washing tub 60 is drivingly connected to the motor 62 via the rotating shaft 61 and the reduction gears for transmitting the rotational motion. Fitted on the middle of the shaft 61 is a bearing 66, whose outer ring corresponds to the anti-rotating casing 2 of the analytical model in the first embodiment. On the outside of the outer ring of the bearing 66, a ring 67 is co-axially located, with the outer ring of the bearing 66 being located such that a clearance of δ is formed therebetween. On the outside of the ring 67, auxiliary springs (elastic members) 68 and auxiliary dampers (damping members) 69 are in turn arranged. Each auxiliary spring 68 is provided with a stopper (stopper member) 70. A plurality of supporting springs (not shown), which are upwardly extended from the lower surface of the cabinet 64, support the washing tub 60, the rotating shaft 61, the motor 62, the lateral cistern 63, the bearing 66, the ring 67, the auxiliary springs 68, the auxiliary dampers 69, and the stoppers 70.

The fourth embodiment can dampen the whirling vibration that is generated when the washing machine is stopped, using simple arrangements. Because the arrangements around the rotating shaft 61 that is connected to the motor 62 can be made compact, a plurality of blade-spring assemblies can act to function as both the elastic members and the damping members, without a need for a larger dashpot.

The Fifth Embodiment

Figure 21A:
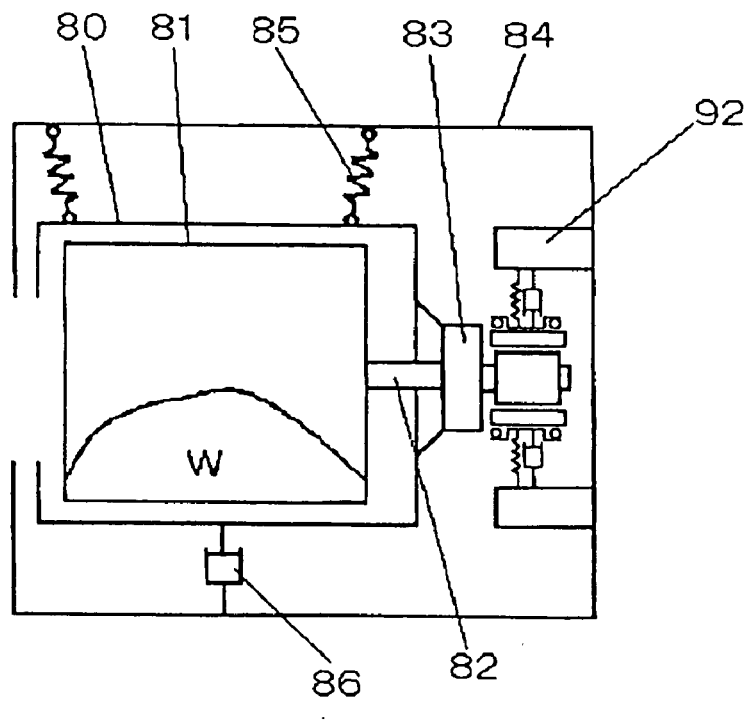
FIG. 21A schematically illustrates another embodiment of the washing machine, in which the suppressing device of the present invention is used.
Figure 21B:
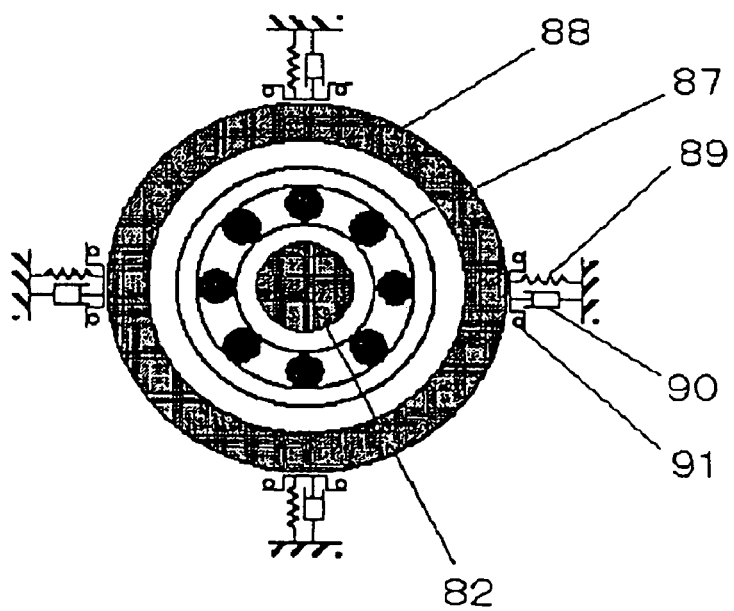
FIG. 21B is a schematic plane view of the damping mechanism in the washing machine of FIG. 21A with a partially sectional view of the mechanism.
Figure 22:
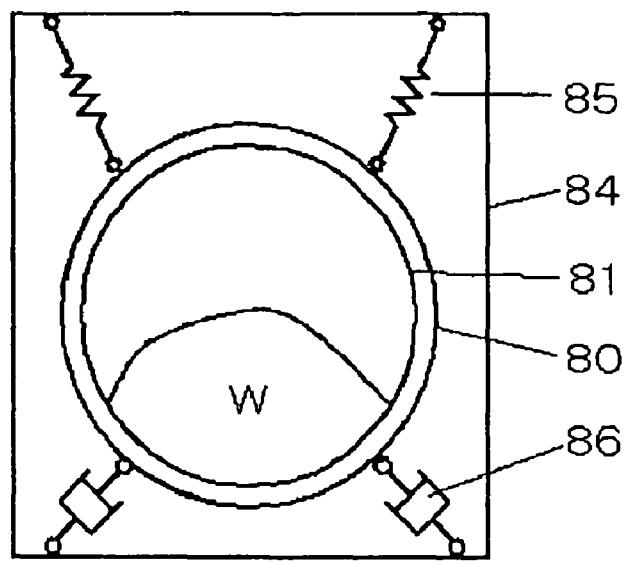
FIG. 22 is a schematic side view of the washing machine of FIG. 21A with a partially sectional view.

In a yet another embodiment, the present invention is also applied to a washing machine. In the washing machine as shown in FIGS. 21A and 22, a washing tub 81 has a horizontal rotating axis, which is in a horizontal attitude in relation to the installation surface of the washing machine such that the washing tub can be rotated within a lateral cistern 80. The washing tub 81 is drivingly connected to a motor 83 via a rotating shaft 82 and reduction gears for transmitting the rotational motion. The lateral cistern 80 receives drainage from the washing tub 81. To insulate it from vibrations, the cistern 80 is suspended from a cabinet 84 by connecting the upper surface of the cistern 80 with the upper inner surface of the cabinet 84 via a plurality of springs 85. Further, the cistern 80 is supported by a plurality of dampers 86 from the lower inner surface of the cabinet 84.

In FIGS. 21A and 22, the washing tub 81 is drivingly connected to the motor 83 via the rotating shaft 82 and the reduction gears for transmitting the rotational motion. Fitted on the middle of the shaft 82 is a bearing 87 whose outer ring corresponds to the anti-rotating casing 2 of the analytical model in the first embodiment. On the outside of the outer ring of the bearing 87, a ring 88 is located such that a clearance of δ is formed therebetween. On the outside of the ring 88, in turn auxiliary springs (elastic members) 89 and auxiliary dampers (damping members) 90 are arranged. Each auxiliary spring 89 is provided with a stopper (stopper member) 91. A plurality of supporting members 92, which are laterally extended from one inner sidewall of the cabinet 84, support the auxiliary springs 89, the auxiliary dampers 90, and the stoppers 91.

The fifth embodiment can dampen the whirling vibration that is generated when the washing machine is stopped, using simple arrangements. Because the arrangements around the rotating shaft 82 that is connected to the motor 83 can be made compact, a plurality of blade-spring assemblies can act to function as both the elastic members and the damping members, without a need for a larger dashpot.

The Sixth Embodiment

Figure 23A:
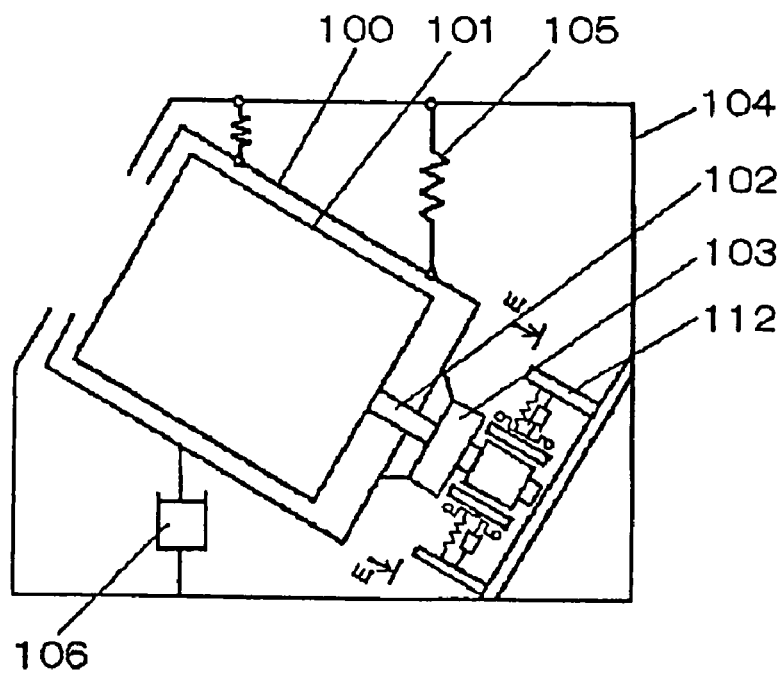
FIG. 23A schematically illustrates another embodiment of the washing machine in which the suppressing device of the present invention is used.

In a yet another embodiment, the present invention is also used for a washing machine. In the washing machine as shown in FIG. 23A, a washing tub 101 has an inclined rotating axis, which is inclined toward the installation surface of the washing machine such that the washing tub 101 can be rotated within a lateral cistern 100. The washing tub 101 is drivingly connected to a motor 103 via a rotating shaft 102 and reduction gears for transmitting the rotational motion. The lateral cistern 100 receives drainage from the washing tub 101. To insulate it from vibrations, the cistern 100 is suspended from a cabinet 104 by connecting the upper surface of the cistern 100 with the upper inner surface of the cabinet 104 via a plurality of springs 105. Further, the cistern 100 is supported by a plurality of dampers 106 from the lower inner surface of the cabinet 104.

Figure 23B:
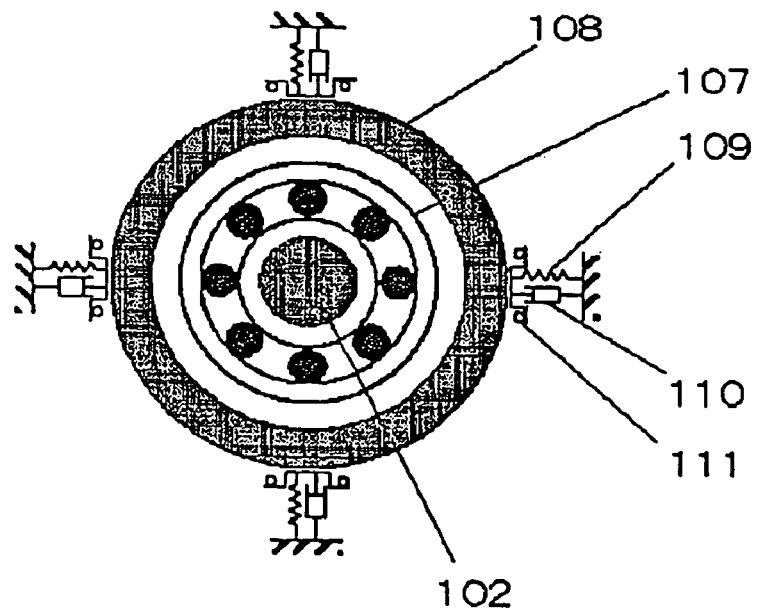
FIG. 23B is a schematic plane view of the damping mechanism in the washing machine of FIG. 21A with a partially sectional view of the mechanism.

In FIGS. 23A and 23B, the washing tub 101 is drivingly connected to the motor 103 via the rotating shaft 102 and the reduction gears for transmitting the rotational motion. Fitted on the middle of the shaft 102 is a bearing 107 whose outer ring corresponds to the anti-rotating casing 2 of the analytical model in the first embodiment. On the outside of the outer ring of the bearing 107, a ring 108 is located such that a clearance of δ is formed therebetween. On the outside of the ring 108, in turn auxiliary springs (elastic members) 109 and auxiliary dampers (damping members) 110 are arranged. Each auxiliary spring 109 is provided with a stopper (stopper member) 111. A plurality of supporting members 112, which are laterally extended from one inner sidewall of the cabinet 104, support the auxiliary springs 109, the auxiliary dampers 110, and the stoppers 111.

The sixth embodiment can dampen the whirling vibration that is generated when the washing machine is stopped, using simple arrangements. Because the arrangements around the rotating shaft 102 that is connected to the motor 103 can be made compact, a plurality of blade-spring assemblies can act to function as both the elastic members and the damping members, without a need for a larger dashpot.

The Seventh Embodiment

In the illustrated embodiment, the present invention is applied to a centrifugal sintering machine. The centrifugal sintering machine includes a high-speed rotating worktable on which a sample to be sintered is placed such that a centrifugal force is applied to the surface of the sample to produce a dense membrane and a sintered body by heating the sample. The range of the centrifugal force generated by the centrifugal sintering machine is preferably 10 to 700,000 G, more preferably 1,000 to 10,000 G.

If the high-speed rotating worktable has a radius of 8 cm, and if a sample is placed on it near its periphery, the centrifugal forces that are applied to the surface of the sample are 22 G at a rotating speed of 500 rpm, 89 G at rotating speed of 1,000 rpm, 201 G at a rotating speed of 1,500 rpm, 357 G at a rotating speed of 2,000 rpm, 804 G at a rotating speed of 3,000 rpm, 2,236 G at a rotating speed of 5,000 rpm, 8,944 G at a rotating speed of 10,000 rpm, 35,776 G at a rotating speed of 20,000 rpm, and 223,600 G at a rotating speed of 50,000 rpm. Because these forces are larger than those generated in a typical hot-pressing sintering method, the centrifugal sintering machine theoretically demonstrates that it has beneficial effects to make a ceramic-precursor membrane denser, and to make a compact composed of ceramic or metallic powder. The centrifugal force facilitates forming a very closely packed structure of particles. The centrifugal force contributes density mechanisms of a plastic deformation of the sintered body by activating a mass diffusion within the material, a viscous flowing, and precipitation and solution treatments under a condition where a liquid phase exists. Accordingly, the centrifugal force contributes to facilitate ceramic and metal materials being made denser, and enables a low-temperature sintering. The range of heating temperatures are, but are not so limited, preferably 300 to 1,800° C., and more preferably 500 to 1,500° C. If the heating temperature is 500° C. or less, a mass diffusion become less common. If the heating temperature is 1,500° C. or more, the rate of the mass diffusion is rapidly increased, and thus the effects of the centrifugal force are inhibited.

Figure 24:
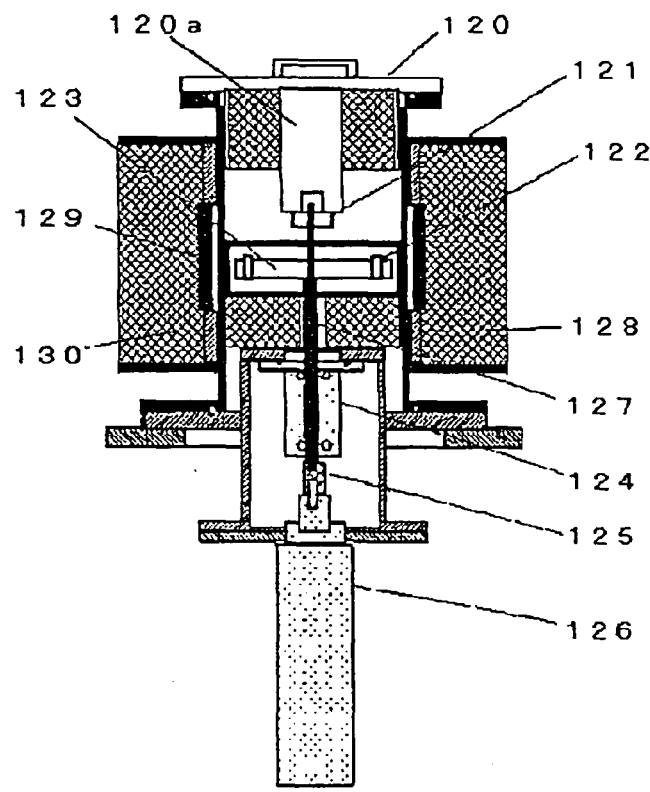
FIG. 24 is a schematic side view of an embodiment of a centrifugal sintering machine in which the suppressing device of the present invention is used, with a partially sectional view.

FIG. 24 shows a centrifugal sintering machine that is similar to the forgoing machine, but where the suppressing device of the present invention is used thereon. In the centrifugal sintering machine, the lower surface of an upper cover 120 is provided with a rod 120a, which is extended downward therefrom. The distal end of the rod 120a is provided with a damping bearing 121. Below the damping bearing 121, a rotor 123 (on which a sample 122 to be sintered is mounted), a lower bearing 124, and a rotational joint 125 (which is jointed to the distal end of a motor rod of a motor 126) are co-axially arranged, in this order. A rotating shaft 127, functioning as a rotating axis in the embodiment, is supported by the damping bearing 121, the lower bearing 124, and the rotating joint 125 such that the center of the rotor 123 is rotationally supported by the rotating shaft 127. The rotor 123 is hermetically sealed within a heating container 128. Arranged near the periphery of the heating container 128 are heaters 129 for heating the sample 122, and thermal insulators 130, which are laid laterally to the heaters 129.

The rotating shaft of the embodiment has a diameter of 3Φ and a length of 75 mm, and is composed of a piano wire (SWP-B). The rotor 128 is composed of silicon nitride ceramics, and has an outer diameter of 180Φ. These materials and the dimensions are just exemplifications, and are not intended to limit the present invention.

Using the rotator 123, which weighs 1.4 kg, as an example, it was found that a resonance rotating speed was reached at 570 rpm. When the damping bearing is located on the upper part of the rotor, no whirling vibration is generated, even when the resonance rotating speed of 570 rpm is reached, and thus the rotation of the rotor can be smoothly started. It has a beneficial effect on unsteady vibrations due to its gradually increasing or decreasing the rotating speed of the rotor.

The Eighth Embodiment

Figure 25:
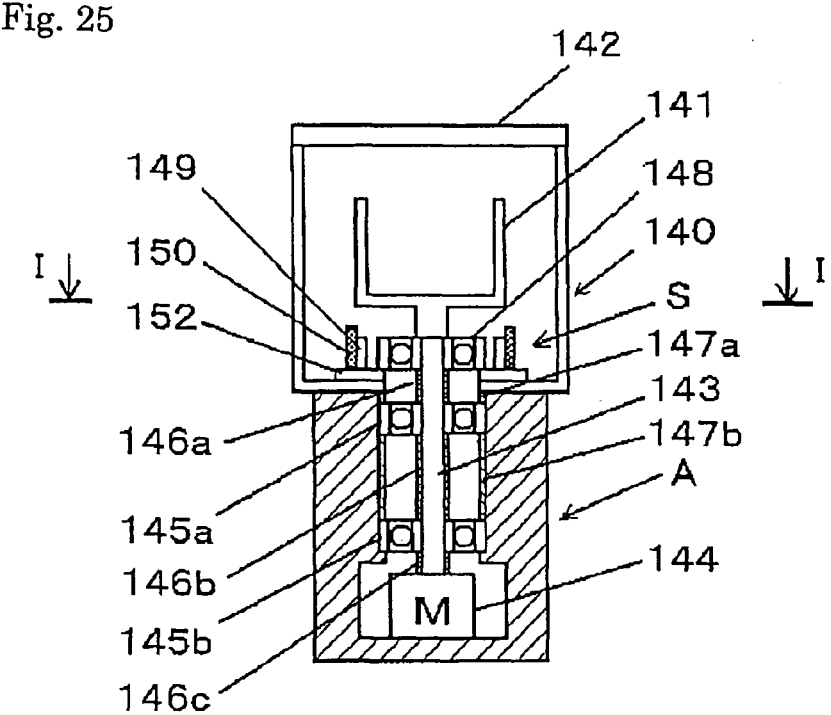
FIG. 25 is a schematic side view of an embodiment of a centrifugal separator in which the suppressing device of the present invention is used, with a partially sectional view.
Figure 26:
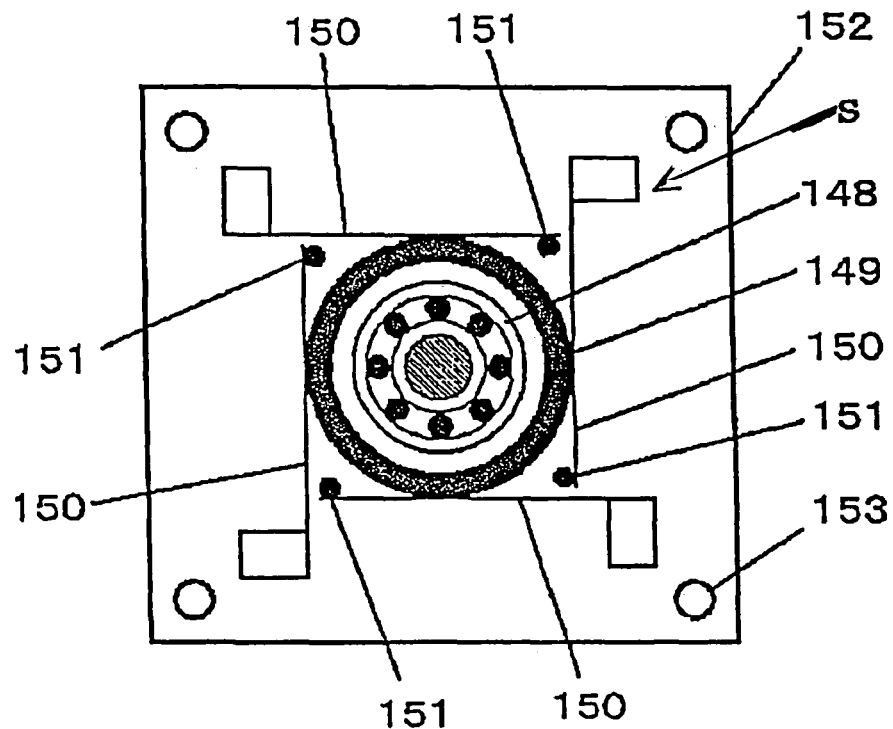
FIG. 26 is a sectional view as taken along arrows I-I in FIG. 25.

FIGS. 25 and 26 schematically illustrate an embodiment of a centrifugal separator to which the present invention is applied. The centrifugal separator includes a base unit A and a chamber 140 fixed on it.

Located in the chamber 140 are a rotor 141 for receiving a sample to be centrifugally separated, and a damping mechanism S, which is located at the lower position in the chamber, for suppressing vibrations generated due to the rotational movement of the rotor 141. While the centrifugal separator is operating, an opening on the upper portion of the chamber 140 is hermetically closed with an upper cover 142. To drivingly rotate the rotor 141 by a motor 144, the distal end of a rotating shaft 143 is connected to the center of the lower surface of the rotor 141, while the proximal end of the rotating shaft is connected to the motor 144. The rotating shaft 143 is mounted in an upper supporting bearing 145a and a lower supporting bearing 145b. For positioning these bearings 145a and 145b, positioning collars 146a, 146b, 146c, 147a, 147b are provided such that they contact the inner and outer rings of the bearings 145a and 145b.

The damping mechanism S includes a bearing 148 for supporting the shaft 143, and a ring (a second anti-rotating ring) 149, which is co-axially arranged on the outer ring (a first anti-rotating ring) of the bearing 148, to form a clearance therebetween. The damping mechanism S also includes four sets of extended blade-spring assemblies 150. The proximal end of each assembly 150 is attached to its respective fixed position in the outside of the ring 149, and is attached to four stoppers 151, each of which is provided with the corresponding free end of a blade-spring assembly 150, to limit the operating range of it. Each blade-spring assembly 150 is composed of one sheet of a blade spring. Each blade-spring assembly 150 is compressed with a preloading pressure to externally dampen a whirling vibration (if one is generated) in the ring 149. Each combination of the blade-spring assembly 150 with the stopper 151 constitutes a damping means for vibration suppression. As shown in FIG. 26, a planar arrangement of the damping mechanism S is similar to that described by the description of FIG. 9B.

The four sets of the blade-spring assemblies 150 have a deflection difference or deflection differences in their elastic coefficients, or unequal sizes (depending on the directions of the clearance), or both.

The bearing 148, the ring 149, the fixtures (the fixed positions) for mounting the blade-spring assemblies 150, and the stoppers 151 are mounted on a base plate 152 on the lower surface in the chamber 140. The base plate 152 is provided with mounting apertures 153 for mounting it on the lower surface in the chamber 140.

As described above, the damping mechanisms for the vibration suppression of the rotating-shaft system of the present invention are located in the centrifugal separator. In this damping mechanism, the damping means (the blade-spring assemblies 150 and the stoppers 151) imparts a restoring force that is equal to or greater than the predetermined force, if the outer ring (the first anti-rotating ring) of the bearing 148 moves over the predetermined range of the clearance. The damping means imparts no restoring force, if the vibrations of the first anti-rotating ring are within the predetermined range of the clearance. Accordingly, the vibrations can be reduced to within a significantly narrow range.

Even if self-induced vibrations due to a discontinuous spring develop, the stacked blade-spring, which is similar to the blade-spring assembly 33 of FIG. 15, if it is employed as the blade-spring assembly 150 in this embodiment, will provide an additional benefit to prevent the development of the self-induced vibrations. In summary, because the damping of the stacked blade-spring is much greater, the result is that the self-induced vibrations are reduced.

Figure 27:
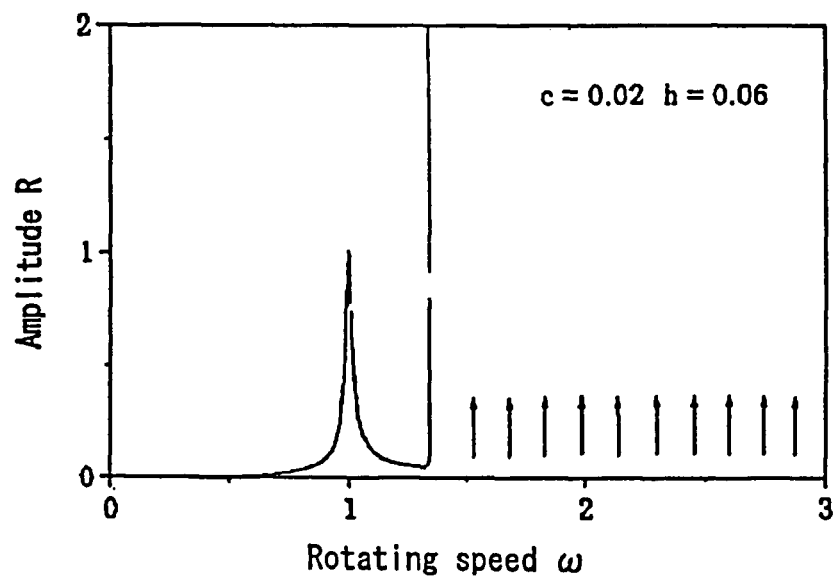
FIG. 27 is a graph showing vibration curves of self-energizing vibrations before the present invention is used.
Figure 28:
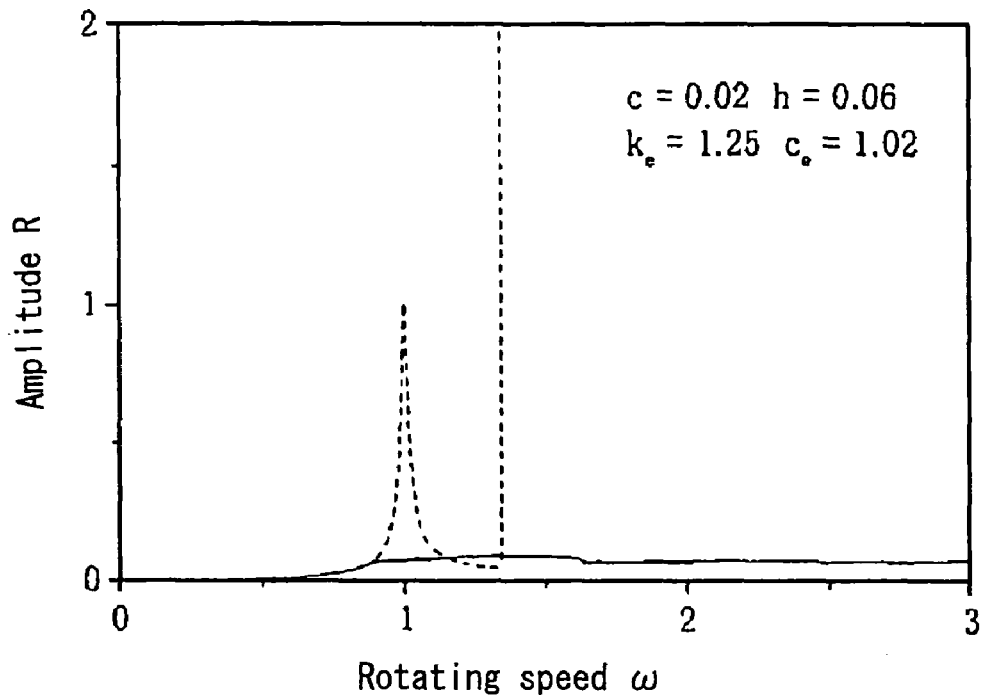
FIG. 28 is a graph showing vibration curves of self-energizing vibrations after the present invention is used.

FIG. 27 shows a vibration curve of a self-induced vibration where the present invention is not used. FIG. 28 shows a vibration curve of a self-induced vibration in which the present invention is used. As shown in FIG. 27, when the rotational speed reaches the point at which self-induced vibrations are induced, the vibrations are instantaneously increased to an infinite value. In contrast, if the present invention is used as in FIG. 28, the increase of the vibrations is reduced, and thus the self-induced vibrations are reduced, even if the rotational speed reaches the point at which the self-induced vibrations are induced. Notably, if the stacked blade-spring is used, energies can be absorbed by friction between the blade springs, and thus the damping mechanism S can be made compact and simplified.

With this embodiment, 1) any resonance vibration can be reduced to a desirable magnitude that is within the predetermined range of the clearance, 2) and any self-induced vibration can also be reduced to be within the predetermined range of the clearance.

Although the damping mechanism is located at the lower portion in the chamber 140 in the seventh embodiment as seen in FIGS. 25-28, it may be located at the lower portion in the chamber 140, as described below with the description of FIGS. 29 and 30.

The Ninth Embodiment

Figure 29:
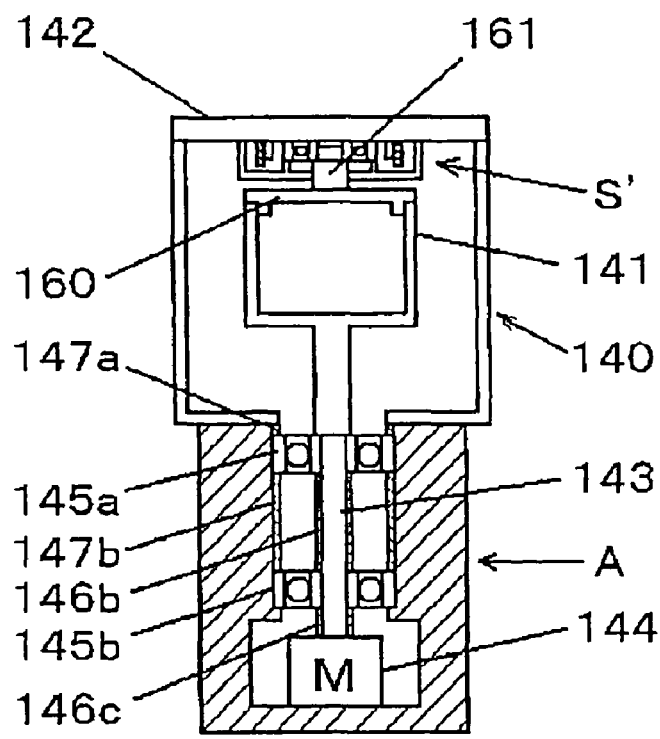
FIG. 29 is a schematic side view of another embodiment of a centrifugal separator in which the suppressing device of the present invention is used, with a partially sectional view.
Figure 30:
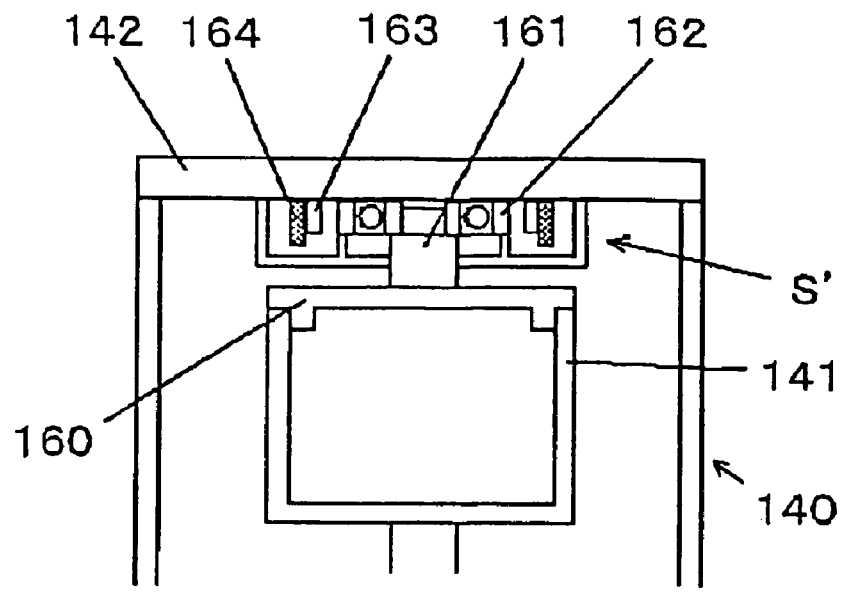
FIG. 30 is a partly enlarged view of FIG. 29.

Another embodiment of the centrifugal separator in which the present invention is used is shown in FIGS. 29 and 30. The elements illustrated herein that are similar to those in the centrifugal separator in the embodiment of FIG. 25 are designated by the same numerals, and thus their descriptions are omitted.

In the chamber 140, a lid 160 is hermetically fitted in an upper opening of the rotor 141. (Note that the rotor 141 of the embodiment of FIG. 25 has no lid, although its upper position is open.) A damping mechanism S' is mounted on the lower surface of the upper cover 142 of the chamber 140. (Note that the damping mechanism S of the embodiment of FIG. 25 is located at the lower portion in the chamber 140.) Attached to the upper surface of the lid 160 is a shaft 161, which is coupled to the damping mechanism S'.

The damping mechanism S' includes a bearing 162 for supporting the shaft 161, and a ring (a second anti-rotating ring) 163, which is co-axially arranged on the outer ring (a first anti-rotating ring) of the bearing 162 to form a clearance therebetween. The damping mechanism S' also includes four sets of extended blade-spring assemblies 164, whose proximal ends are attached to four fixed positions on the outside of the ring 163, and four stoppers. The stoppers are not shown, but are similar to the stoppers 151 as in FIG. 25. Each stopper is provided with the corresponding free end of the blade-spring assembly 164 to limit the operating range of it. Each blade-spring assembly 164 is composed of one sheet of a blade spring or a stack of a plurality of blade-springs. Each blade-spring assembly 164 is compressed with a preloading pressure to externally dampen a whirling vibration (if one is generated) in the ring 163. Each combination of the blade-spring assembly 164 with the stopper constitutes a damping means for vibration suppression. A planar arrangement of the damping mechanism S' is, for example, similar to that described by the description of FIG. 9B.

The four sets of the blade-spring assemblies 164 have a deflection difference or deflection differences in their elastic coefficients, or unequal sizes (depending on the directions of the clearance), or both.

The functions of the damping mechanism S' in this embodiment are similar to those of the damping mechanism S in the forgoing embodiment. Accordingly, the resonance vibration in the centrifugal separator can be reduced with the simplified structure of the ninth embodiment, as well as with the eighth embodiment.

Note that the eighth embodiment (FIGS. 25-28) and the ninth embodiment (FIGS. 29 and 30) are not limited to the illustrated constructions. Although the transmission in which the shaft 143 is directly connected to the motor 144 is illustrated herein, of course an alternative transmission in which the shaft 143 is connected to the motor 144 via a belt may be combined with the device and method of vibration suppression of a rotating-shaft system.

Although the rotor 141 of the centrifugal separator is attached to the distal end of the rotating shaft 143, it may, for example, be mounted in the middle of the rotating shaft 143. Accordingly, the mounting position for the rotor 141 may be selected along with the rotating shaft 143. Although the motor 144 of the centrifugal separator is located below the rotor 141, an alternative layout, i.e., where it is located above the rotor 141, may be selected, for example. Because the types of the motor 144 are not limited to the specified one, an electrical motor, a pneumatic motor, a hydraulic motor, etc., for example, may be used. The mounting site for the damping mechanism is illustrated as being on, but it is not limited to, the lower surface in the chamber 140 (the damping mechanism S in the eighth embodiment) or the lower surface of the upper cover 142 (the damping mechanism S' in the ninth embodiment). Alternatively, the damping mechanism may be mounted, for example, above or inside the base unit A. If desirable, a plurality of damping mechanisms may be provided. The rotor 141 of the centrifugal separator may take to, but it is not limited to, a version for removing and collecting floating impurities in fluids, a version for receiving a sample to be directly processed (e.g., to be spun dry), or a version for receiving a container for containing a specimen to be separated.

The Tenth Embodiment

Figure 31A:
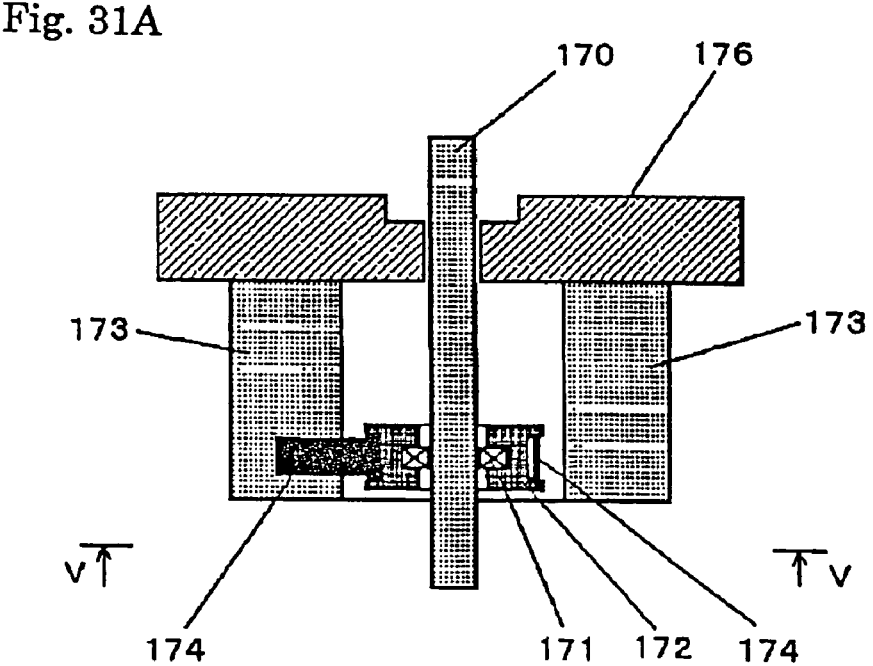
FIG. 31A is a schematic elevational cross-sectional view of a damping mechanism of another embodiment.
Figure 31B:
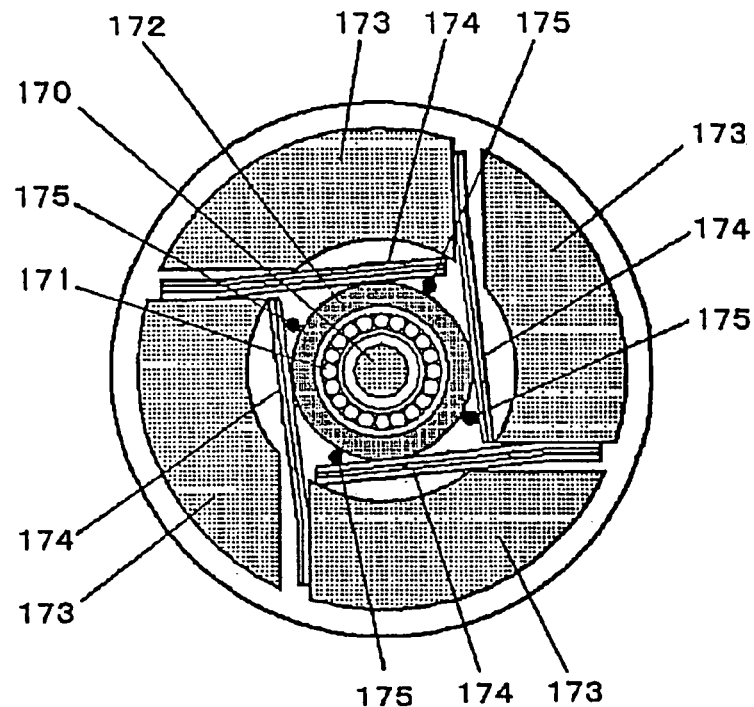
FIG. 31B is a sectional view as taken along arrows V-V in FIG. 31A.

FIGS. 31A and 31B show another embodiment of the present invention, where a damping mechanism is designed to omit a second anti-rotating rotor. The damping mechanism T includes a bearing 171, which is arranged on a rotating shaft 170 to form a clearance therebetween, and a ring (a first anti-rotating ring) 172, which is co-axially mounted on the rotating shaft 170 through the intermediary of the bearing 171. The damping mechanism T also includes four sets of extended blade-spring assemblies 174, whose proximal ends are attached to four respective positions on a frame 173 on the outside of the ring 172, and four stoppers 175, each of which is provided with the corresponding free end of the blade-spring assembly 174, to limit the operating range of it. Each blade-spring assembly 174 is composed of a plurality of blade-springs, which are stacked. In this embodiment, three of the blade-springs are stacked in each of the two sets of the blade-spring assemblies 174 in the horizontal direction (the x-axis), while two of the blade-springs are stacked in each of the two sets of the blade-spring assemblies 174 in the vertical direction (the y-axis).

Each blade-spring assembly 174 is compressed with a pre-loading pressure to externally dampen a whirling vibration (if one is generated) in the ring 172. Each combination of the blade-spring assembly 174 with the stopper 175 constitutes a damping means for vibration suppression.

The four sets of the blade-spring assemblies 174 have a deflection difference or deflection differences in their elastic coefficients, or (depending on the differences) unequal sizes of the clearance, or both.

In the above damping mechanism T, the damping means imparts a restoring force that is equal to or greater than the predetermined force, if the rotating shaft 170 moves over the predetermined range of the clearance. The damping means imparts no restoring force, if the vibrations of the rotating shaft 170 are within the predetermined range of the clearance. Accordingly, the vibrations can be reduced within a very narrow range.

The Eleventh Embodiment

This embodiment proposes a combination of a device for continuously damping the energy of a rotor (hereafter, "a damping unit to suppress self-induced vibrations") with a device using a discontinuous spring (hereafter, "a damping unit to suppress sympathetic vibrations") of FIG. 31. The damping unit to suppress self-induced vibrations can be constructed by, for example, providing a blade-spring assembly that is contacted by the rotating shaft without any clearance. The damping unit to suppress self-induced vibrations is not limited to the specified construction, even though it enables the continuous damping of rotational energy. However, if in the blade-spring assembly a plurality of blade springs are stacked, the unit can be made compact. Any selected number of both the damping unit to suppress self-induced vibrations and the damping unit to suppress sympathetic vibrations to be combined, may be used.

Figure 32:
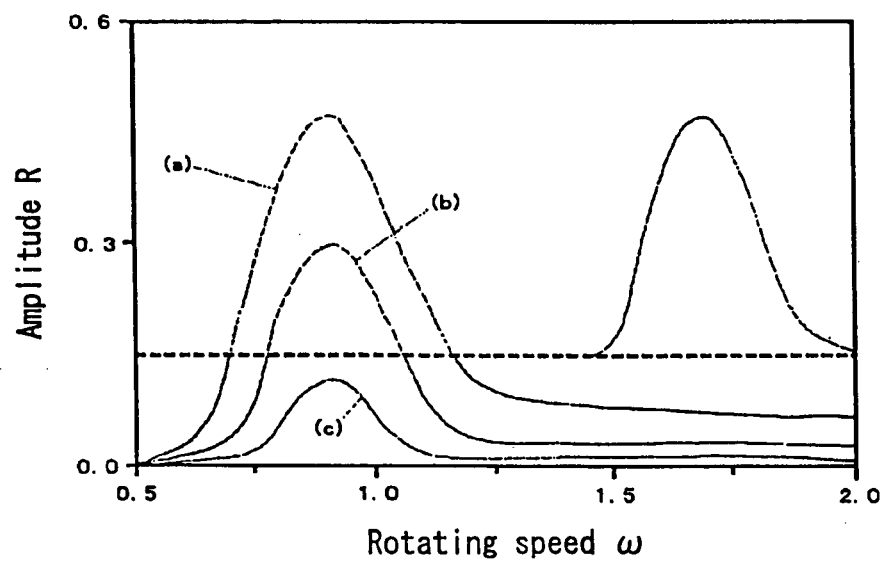
FIG. 32 is a graph showing vibration curves of self-energizing vibrations of the damping mechanism of FIG. 31A.

The functions of this embodiment are shown in FIG. 32, which corresponds to FIG. 4, but the damping unit to suppress self-induced vibrations has been added. As previously discussed by the description of FIG. 4, the damping unit, which utilizes the auxiliary spring with the preloading pressure to suppress sympathetic vibrations, can reduce the vibrations of the rotor to only the order of the clearance of $\delta$. By adding the damping unit to suppress self-induced vibrations to the damping unit to suppress sympathetic vibrations, the energy of the rotor can be continuously reduced, and thus the peak of the amplitude can be lowered.

As can be seen from FIG. 32, the decrease in energy in the portion (a) is greater than that in portion (b). Further, if the energy is further decreased, a case (c), in which the peak of the amplitude is smaller than the clearance of $\delta$, can be found.

If the rotating system operates normally, the system is stabilized and thus there is not always a need to use the damping unit to suppress sympathetic vibrations. However, possibly an imbalance in the weighted center of the rotating system or in the rotor may be generated, and this may produce a greater amplitude. For example, such a possible case may occur if a turbine blade is damaged white rotating, or if one forgets to insert a test tube into a rotor in a type of centrifugal separator in which a test tube should be so inserted to the rotor, and if a rotor without the test tube is rotated. In such a case, the damping unit to suppress sympathetic vibrations can be effectively operated. More specifically, if imbalance-induced greater vibrations are generated near the primary critical speed, and if such an imbalance attributed to the vibrations cannot be removed instantly, the vibrations of the rotor can be reduced to be at the same level as the clearance, based on the functions described in relation to FIG. 4 of the damping unit to suppress sympathetic vibrations.

Accordingly, if an imbalance is detected, there is no need to suspend the rotating of the rotating-shaft system, and thus the rotating can be continued. For the same reason, a detector to detect an abnormal operation may be omitted from the rotating-shaft system. Further, this embodiment produces a safety arrangement that can be widely used for rotating-shaft systems, since any local imbalance in the rotating-shaft system is completely prevented from being sequentially propagated through the rotating-shaft system.

The devices and methods of vibration suppression of the rotating-shaft system of the present invention can be used available for mechanisms for vibration suppression in a variety of rotating-shaft systems, as, for example, a centrifugal separator, a washing machine, a spin dryer, a low-profile rotating shaft, a liquid container, and a ball balancer. They can also be used for vibration suppression of rotating-shaft systems to drive an engine in, for example, an automobile, airplane, and ship. They may be used in a backup system in a magnetic bearing.

In addition, they can be used for an abnormal rotating operation during which an imbalance in the weighted center of the rotating system or in the rotor may be generated. For example, such an abnormal rotating operation occurs if a turbine blade is damaged while it is rotating, or if one forgets to insert a test tube into a rotor in a type of centrifugal separator in which the test tube should be inserted in the rotor, and if the rotor without the test tube is rotated. In such a case, a whirling vibration can be readily controlled without the need to detect any imbalance or to suspend the rotating of the rotating-shaft system.

Any of the devices for vibration suppression of the rotating-shaft system of the present invention may be constructed as an integrated unit, which may be detachably mounted on the rotating-shaft system.

Those skilled in the art can appreciate that various modifications and changes can be made without departing from the scope and the spirit of the invention as defined by the appended claims.

Although the rotating shaft of this system in which the present invention is used is designed as a vertical shaft in the embodiments, its design is not limited to that as shown, and it may be designed as a horizontal shaft. The freedom-in selecting the site (e.g., the upper, the middle, or the lower rotating shaft) for the installation of the present invention can be increased.

The device and method of the present invention can also be used in a variety of rotating machinery, rather than those described herein. Although the device and method of the present invention may be used in mechanical units of a variety of rotating machinery, it is not limited to such an application.

The invention claimed is:

1. A device for suppressing the whirling vibration of a rotating-shaft system that includes at least a rotating shaft and a rotating rotor supported by the rotating shaft, said device comprising:
a first anti-rotating casing for surrounding said rotating shaft such that a radial direction of said casing is substantially orthogonal to said rotating shaft, wherein said first anti-rotating casing is arranged so that a whirling vibration of said rotating-shaft system can be transferred to said first anti-rotating casing, but wherein said first anti-rotating casing cannot rotate;
a second anti-rotating casing laterally-placed apart from said first anti-rotating casing to create a clearance within a predetermined range between said first anti-rotating casing and said second anti-rotating casing; and
suppressing means for suppressing the whirling vibration, said suppressing means including an elastic member having one end attached to a fixed position on an outside of said second anti-rotating casing, and having a free end, wherein said elastic member is compressed by applying a preload so as to suppress the whirling vibration of said rotating-shaft system from radiating outward thereof, and a stopper member that is located at a side of the free end of the elastic member for limiting an operating range of said elastic member.

2. The device of claim 1, wherein a deflection difference is provided between said clearance that generates a force that is provided to dampen the whirling vibration.

3. The device of claim 1, wherein said stopper member mechanically limits said operating range of said elastic member.

4. The device of claim 1, further comprising adjusting means for adjusting the magnitude of the restorative force of said elastic member, the magnitude of said preload to compress said elastic member, and said position of the stopper member.

5. The device of claim 1, wherein the whirling vibration of the rotating-shaft system is an unsteady vibration.

6. The device of claim 1, wherein said rotating-shaft system cooperates in a rotating machinery.

7. The device of claim 6, wherein said rotating machinery includes a washing machine or a centrifugal machine.

8. The device of claim 7, wherein said rotating machinery is a washing machine that includes a washing tub and a motor, and the rotating-shaft system is attached to a shaft that connects the washing tub to a rotating axis of said motor.

9. The device of claim 8, wherein the location of said first anti-rotating casing is beneath said washing tub, or is laterally on said washing tub, or is located near said washing tub.

10. The device of claim 1, wherein said clearance is variable, and wherein a force for suppressing the whirling vibration is provided by a restoring force of said rotating shaft itself or provided by restoring forces of said rotating shaft and a plurality of springs, based on the sizes of the clearance.

11. The device of any one of claims 1 or 10, wherein said first anti-rotating casing is a bearing for supporting said rotating shaft.

12. The device of any one of claims 1 or 10, wherein said second anti-rotating casing forms an annular shape.

13. The device of any one of claims 1 or 10, wherein a plurality of said suppressing means is positioned at a plurality of positions.

14. The device of claim 13, wherein a deflection difference is provided between said elastic member of one of said suppressing means and said elastic member of another suppressing means to generate a force that is provided to suppress the whirling vibration.

15. The device of claim 13, wherein each elastic member is a blade-spring assembly.

16. The device of claim 15, wherein each blade-spring assembly comprises one sheet of a blade spring or blade springs in which a plurality of blade springs is stacked.

17. The device of claim 16, wherein the number of said blade springs or said blade springs of at least one blade-spring assembly differs from that of all other blade-spring assemblies.

18. A device for suppressing a whirling vibration of a rotating-shaft system that includes at least a rotating shaft and a rotating rotor supported by the rotating shaft, said device comprising:
one anti-rotating casing for surrounding said rotating shaft to create a clearance between said anti-rotating casing and said rotating shaft such that the radial direction of said casing is substantially orthogonal to said rotating shaft, wherein said casing is arranged such that the whirling vibration of said rotating-shaft system can be transferred to said casing, but such that said casing cannot rotate:

means for suppressing the whirling vibration including at least one elastic member having one end attached to a fixed position on an outside of said one anti-rotating casing, and having a free end, wherein said elastic member is compressed by applying a preload so as to suppress the whirling vibration of said rotating-shaft system; and a stopper member that is located at a side of the free end of the elastic member for limiting an operating range of said elastic member.

19. The device of claim 18, further comprising a damping unit having a plurality of blade springs that are in contact with said rotating shaft for continuously damping the energy of said rotor.

20. The device of claim 18, wherein said anti-rotating casing is co-axially mounted on said rotating shaft through the intermediary of a bearing for supporting said rotating shaft.

21. The device of claim 18, wherein a predetermined range of the size of said clearance is established by a combination of said elastic member and said stopper member.

22. A method for suppressing a whirling vibration of a rotating-shaft system that includes at least a rotating shaft and a rotating rotor supported by the rotating shaft, said method comprising the steps of:

providing a first anti-rotating casing for surrounding said rotating shaft such that a radial direction of said casing is substantially orthogonal to said rotating shaft, wherein said casing is arranged so that a whirling vibration of said rotating-shaft system can be transferred to said casing, but so that said casing cannot rotate;

outwardly and concentrically providing a second anti-rotating casing for said first anti-rotating casing to create a clearance within a predetermined range between said first anti-rotating casing and said second anti-rotating casing;

providing an auxiliary spring that is compressed by applying a preload near said second anti-rotating casing so as to contact or not contact the periphery of said second anti-rotating casing based on the magnitude of the whirling vibration of said rotating-shaft system; and wherein the vibration characteristic of said rotating-shaft system is in a first state or a second state based on whether said auxiliary spring contacts said first anti-rotating casing, if $r \leqq \delta$, said vibration characteristic being in said first state where said rotating-shaft system vibrates sympathetically in $\omega = \sqrt{(k_1/m)}$, since the spring constant of $k_1$ of said rotating shaft is small, and if $r \geqq \delta$, said vibration characteristic is in said second state where said rotating-shaft system vibrates sympathetically at $\omega = \sqrt{\{(k_1+k_2)/m\}}$, since the stiffness of the spring constant of $k_2$ of said auxiliary spring is added, where $\omega$ is a rotation velocity of said rotor, $\delta$ is a width of said clearance measured along a radial direction of said casings, m is the combined masses of said rotor and said first anti-rotating casing and r is a displacement of said rotor.

* * * * *